US012784122B2

(12) United States Patent
Modaikkal et al.

(10) Patent No.: US 12,784,122 B2
(45) Date of Patent: Nov. 3, 2026

(54) EFFICIENT MULTIPLE PARTIAL UPDATES IN DISPLAY PROCESSING

(71) Applicant: QUALCOMM Incorporated, San Diego, CA (US)

(72) Inventors: Sreekanth Modaikkal, Bangalore (IN); Abhijit Kumar Gupta, Bangalore (IN); Kumar Saurabh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 18/485,220

(22) Filed: Oct. 11, 2023

(65) Prior Publication Data

US 2025/0124535 A1 Apr. 17, 2025

(51) Int. Cl.
*G06T 1/20* (2006.01)

(52) U.S. Cl.
CPC .................................... *G06T 1/20* (2013.01)

(58) Field of Classification Search
CPC . G06T 1/20; G06T 1/60; G09G 5/393; G09G 2310/04; G09G 2360/127
USPC .......................................................... 345/545
See application file for complete search history.

(56) References Cited

U.S. PATENT DOCUMENTS

| | | | | | |
|---|---|---|---|---|---|
| 5,579,057 | A * | 11/1996 | Banker | H04N 21/488 | 348/E7.054 |
| 6,911,983 | B2 * | 6/2005 | Sabella | G09G 5/393 | 345/503 |
| 7,256,788 | B1 * | 8/2007 | Luu | G06F 1/3243 | 713/340 |
| 2011/0050713 | A1 * | 3/2011 | McCrary | G06F 9/3851 | 345/530 |
| 2011/0279463 | A1 * | 11/2011 | Yang | G06T 1/60 | 345/522 |
| 2016/0329033 | A1 * | 11/2016 | Woo | G09G 5/393 | |
| 2019/0043406 | A1 * | 2/2019 | Ansari | G09G 3/20 | |

* cited by examiner

*Primary Examiner* — Jacinta M Crawford
(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for efficient multiple partial updates in display processing. A processor may obtain a software-based indication that indicates to start an execution of command packets. The processor may execute, based on the obtained software-based indication, a first set of command packets associated with a first ROI of a frame that is to be updated. The processor may obtain a hardware-based indication that indicates that the first set of command packets associated with the first ROI of the frame has been executed. The processor may execute, based on the obtained hardware-based indication, a second set of command packets associated with a second ROI of the frame that is to be updated.

30 Claims, 19 Drawing Sheets

EFFICIENT MULTIPLE PARTIAL UPDATES IN DISPLAY PROCESSING

TECHNICAL FIELD

The present disclosure relates generally to processing systems, and more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques for a multiple partial update of a frame may miss an update when regions of interest (ROIs) of the frame are too close to one another. There is a need for improved techniques pertaining to multiple partial updates of frames.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus for display processing are provided. The apparatus includes a memory; and a processor coupled to the memory and, based on information stored in the memory, the processor is configured to: obtain a software-based indication that indicates to start an execution of command packets; execute, based on the obtained software-based indication, a first set of command packets associated with a first region of interest (ROI) of a frame that is to be updated; obtain a hardware-based indication that indicates that the first set of command packets associated with the first ROI of the frame has been executed; and execute, based on the obtained hardware-based indication, a second set of command packets associated with a second ROI of the frame that is to be updated.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
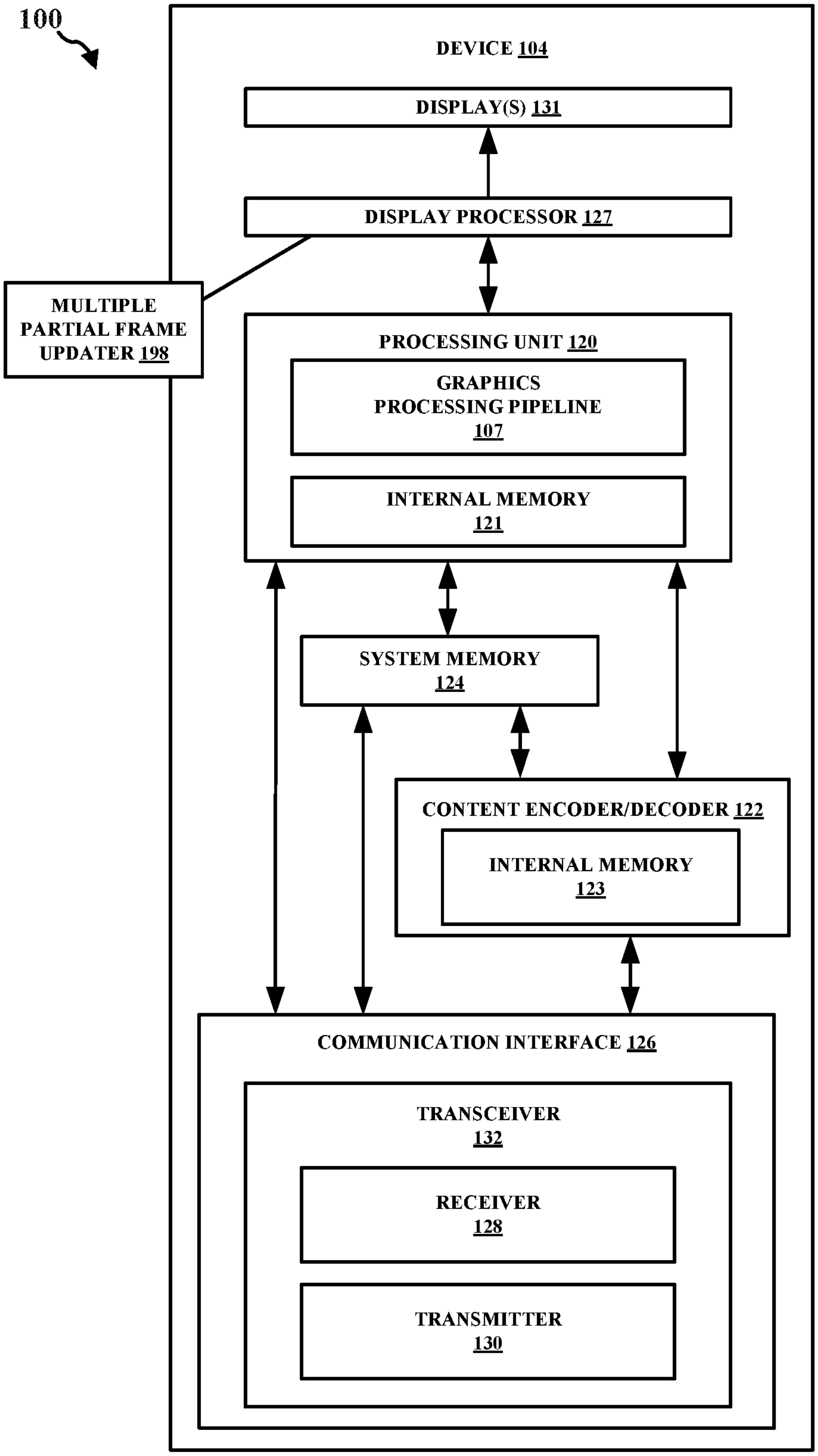
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A multiple partial frame update may refer to a feature that supports updating regions of interest (ROIs) of a frame, as opposed to the entirety of a frame. As ROIs of a frame are updated in a multiple partial frame update (as opposed to all regions of the frame), multiple partial frame updates may conserve computing resources and/or battery power of a device. A multiple partial frame update may be useful in scenarios in which there is little content change between two successive frames. A device may perform a multiple partial frame update for ROIs of a frame based on (multiple) software based indications received for each ROI of the frame. However, the (multiple) software based indications may be associated with latency which may cause the device to miss updating an ROI. This may prevent the device from successfully performing the multiple partial frame update for the frame and/or may lead to tearing effects when the frame is displayed.

Various technologies pertaining to efficient multiple partial updates in display processing are described herein. In an example, an apparatus (e.g., a display processor) obtains a software-based indication that indicates to start an execution of command packets. The apparatus executes, based on the obtained software-based indication, a first set of command packets associated with a first region of interest (ROI) of a frame that is to be updated. The apparatus obtains a hardware-based indication that indicates that the first set of command packets associated with the first ROI of the frame has been executed. The apparatus executes, based on the obtained hardware-based indication, a second set of command packets associated with a second ROI of the frame that is to be updated. Vis-à-vis executing the second set of command packets based on the obtained hardware based indication, the apparatus may perform a multiple partial frame update with reduced latency compared to another apparatus that executes the second set of command packets based on a (second) software based indication. The reduced latency may enable the apparatus to successfully perform a multiple partial frame update for a frame when ROIs of the frame are relatively close to one another and may prevent or mitigate tearing effects when the frame is displayed.

Multiple partial update may refer to a feature that allows processing in regions of interest (ROIs) which may be useful for low power mode. However, when ROIs are too close to each other, multiple partial update may not be used because the update may be missed due to interrupt service request (ISR) latency and configuration execution latency. In one aspect described herein, a lookup table direct memory access (LUTDMA), which may be a faster engine than an advance high-performance bus (AHB) interface, may program an ROI configuration faster, thus reducing configuration execution latency. ISR Latency may be removed as the LUTDMA prepares a packet for all the ROIs at the beginning of the frame, and thus a LUTDMA based design may not have to wait for ISR latency before the LUTDMA can configure a next ROI. The first trigger for LUTDMA may be software (SW) controlled, and successive triggers for the LUTDMA may be generated in hardware (HW) based on completion of a previous ROI (i.e., ROI_DONE_irq).

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include a multiple partial frame updater 198 configured to obtain a software-based indication that indicates to start an execution of command packets; execute, based on the obtained software-based indication, a first set of command packets associated with a first region of interest (ROI) of a frame that is to be updated; obtain a hardware-based indication that indicates that the first set of command packets associated with the first ROI of the frame has been executed; and execute, based on the obtained hardware-based indication, a second set of command packets associated with a second ROI of the frame that is to be updated. Although the following description may be focused on display processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
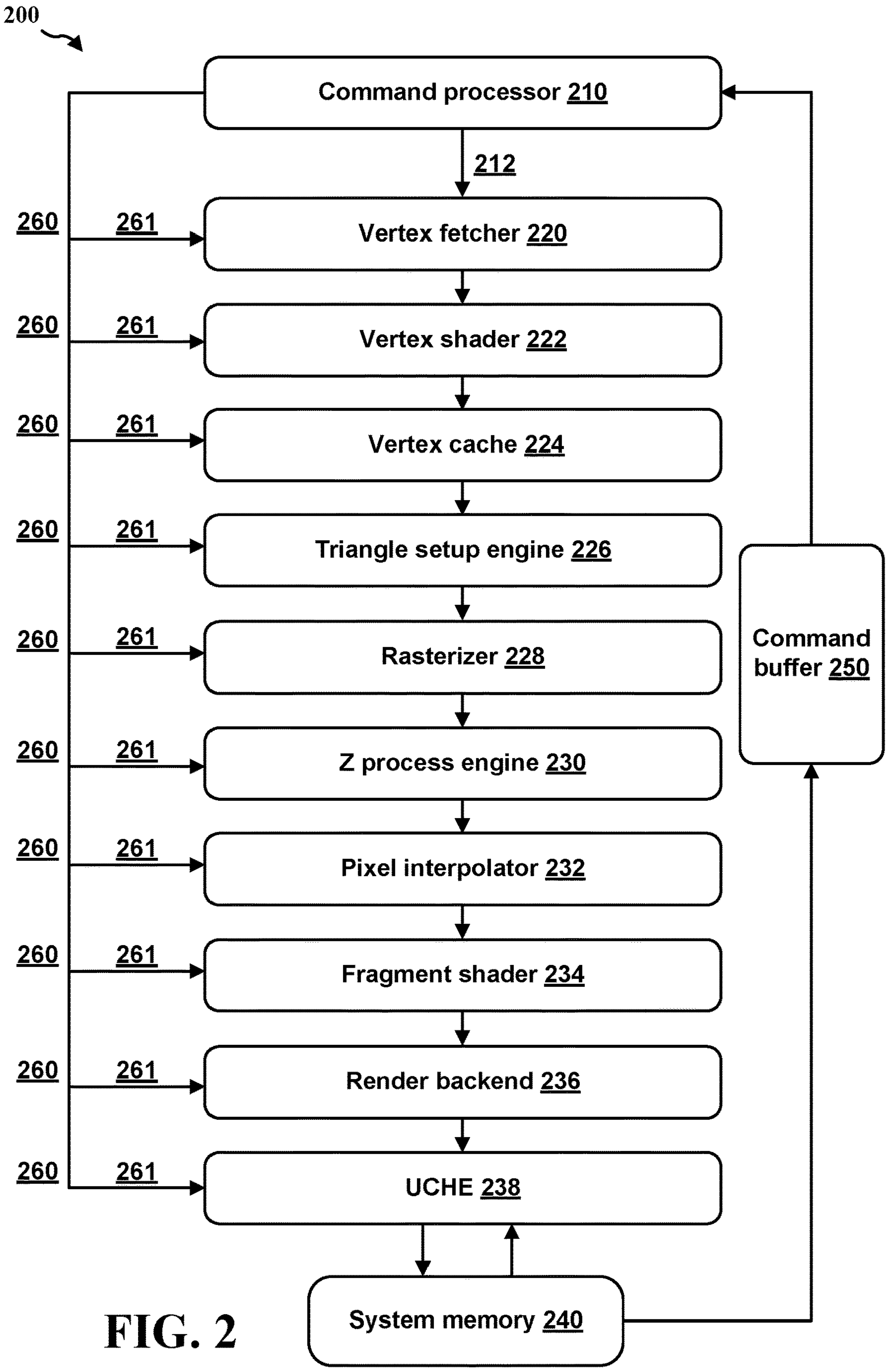
FIG. 2 illustrates an example graphics processor (e.g., a graphics processing unit (GPU)) in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
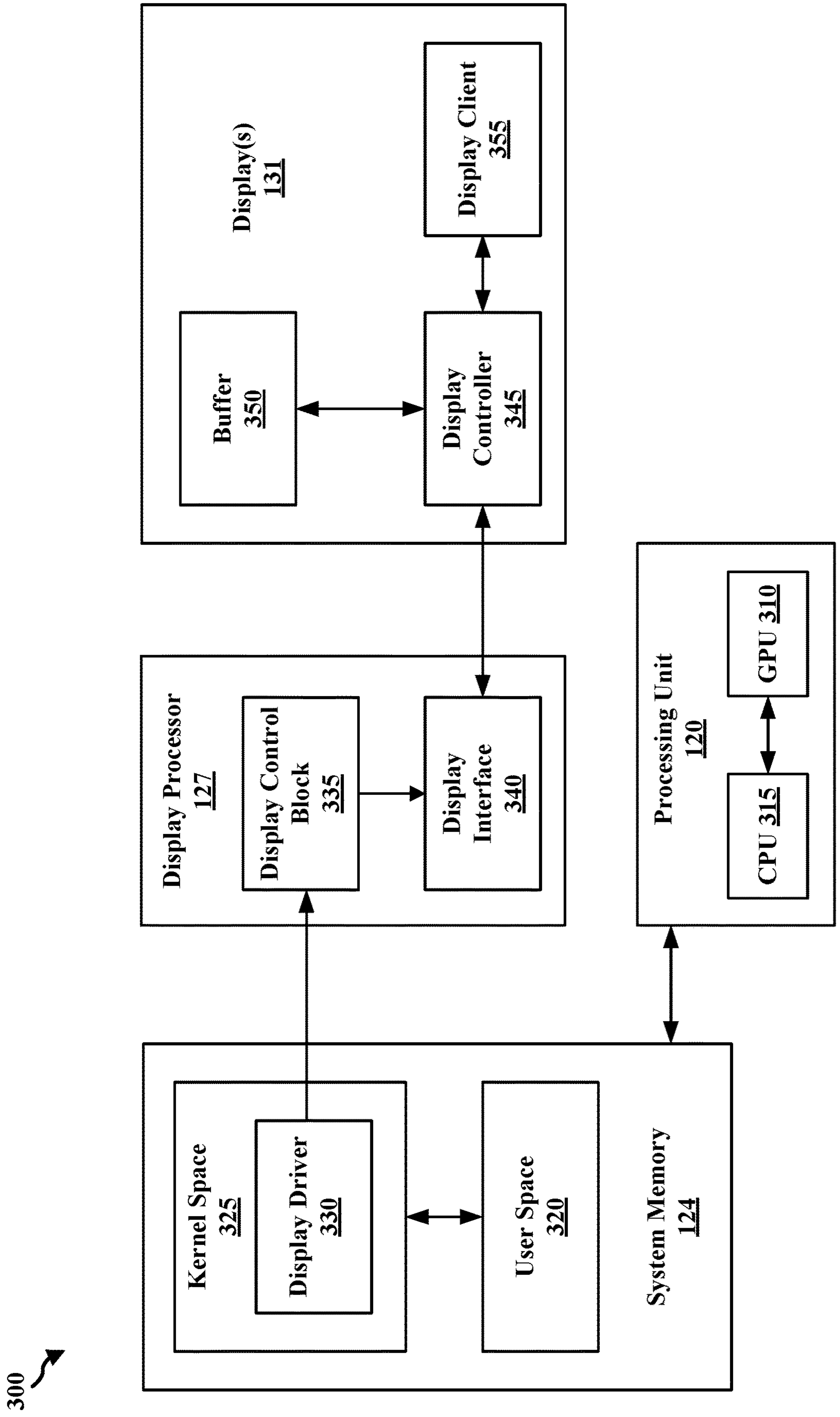
FIG. 3 illustrates an example display framework including a display processor and a display in accordance with one or more techniques of this disclosure.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an “application space”) may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in double data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
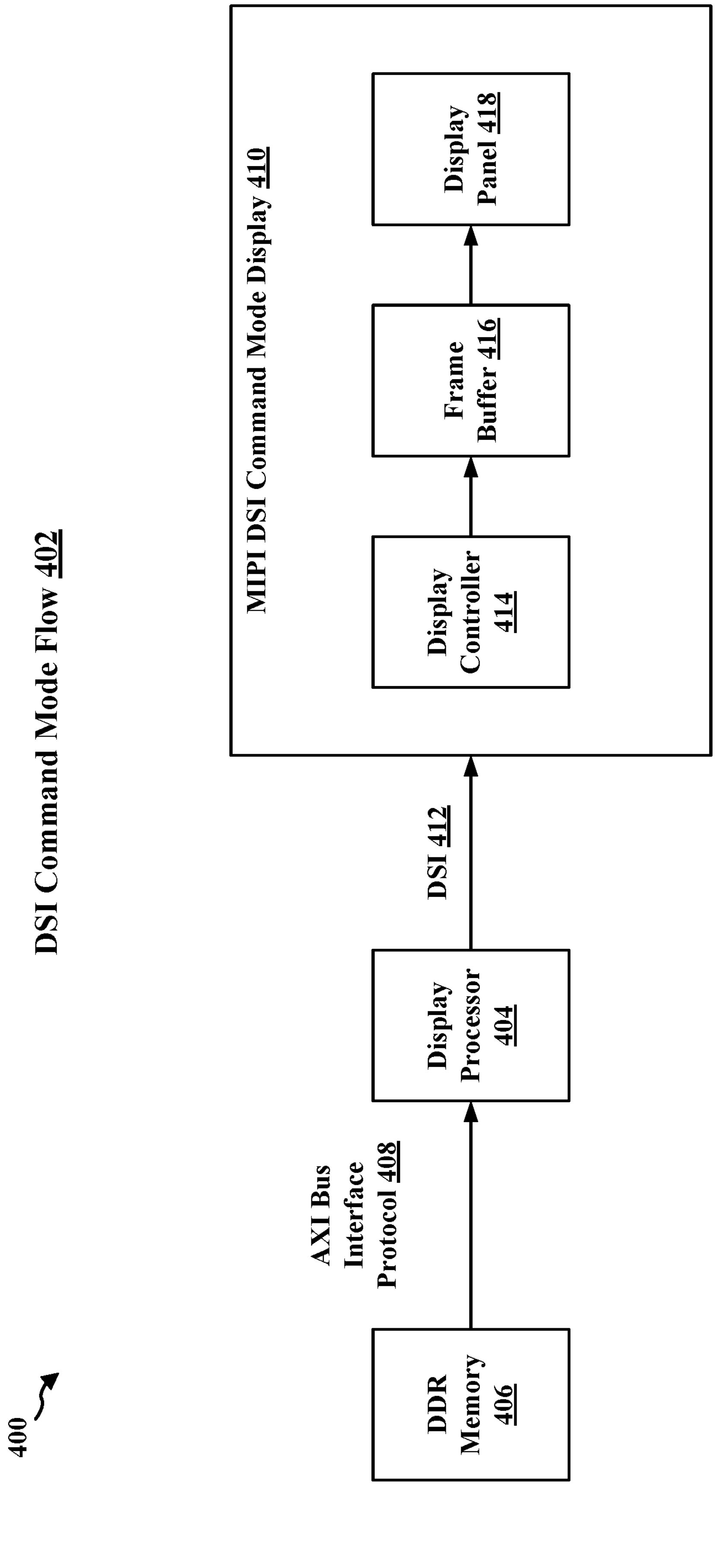
FIG. 4 is a diagram illustrating an example of a display serial interface (DSI) command mode flow in accordance with one or more techniques of this disclosure.

FIG. 4 is a diagram 400 illustrating an example of a display serial interface (DSI) command mode flow 402 in accordance with one or more techniques of this disclosure. The DSI command mode flow 402 may be performed by the device 104. In the DSI command mode flow 402, a display processor 404 (e.g., the display processor 127) may fetch an image (i.e., a frame) from double data rate (DDR) memory 406 via an auxiliary (AXI) bus interface 408. The display processor 404 may perform processing on the image. The display processor 404 may send (i.e., transmit) the processed image to a MIPI DSI command mode display 410 via a DSI 412. In an example, the display processor 404 may send the frame to a display controller 414 of the MIPI DSI command mode display 410, where the display controller 414 may store the processed frame in a frame buffer 416. The display controller 414 may send the processed frame (stored in the frame buffer 416) to a display panel 418 (e.g., the display(s) 131) of the MIPI DSI command mode display 410, whereupon the processed frame may be presented on the display panel 418.

Figure 5:
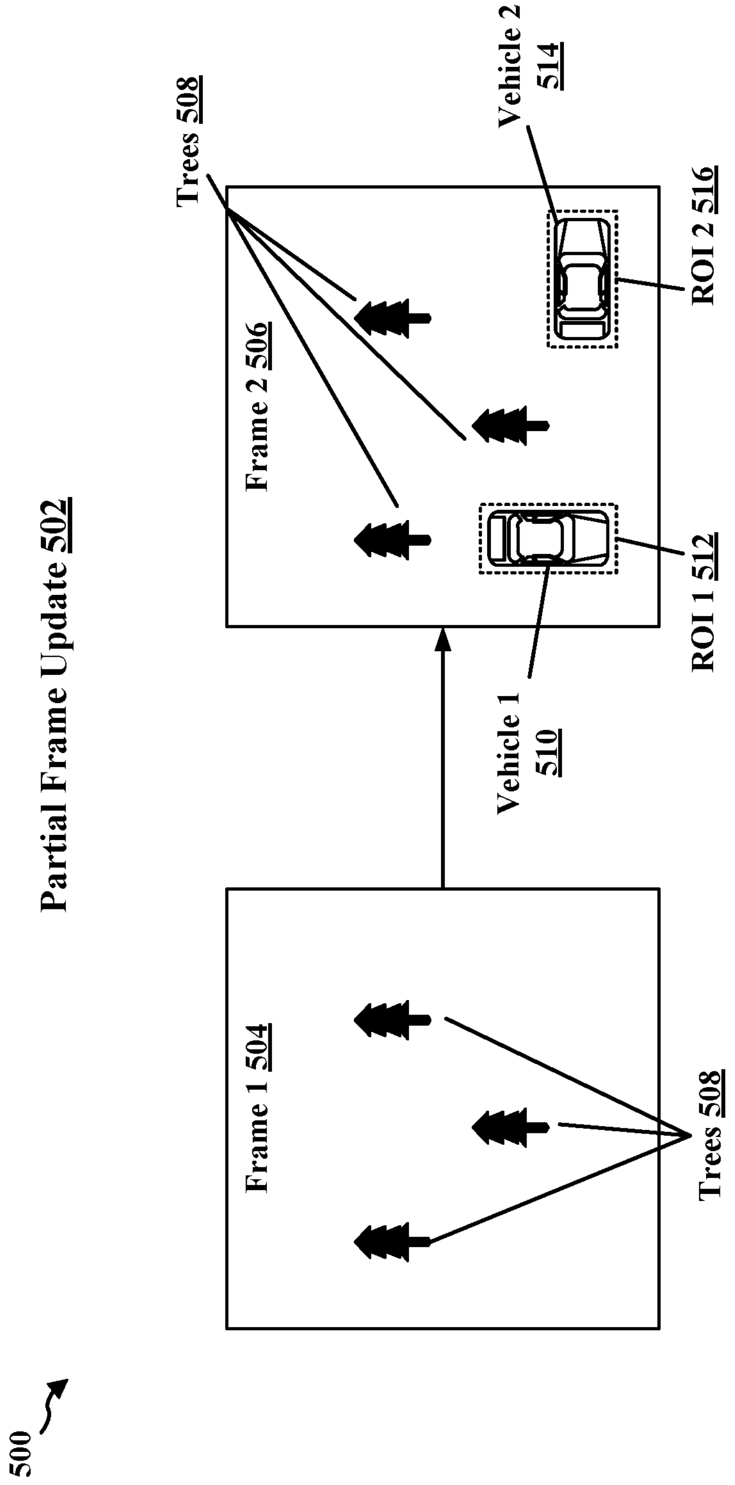
FIG. 5 is a diagram illustrating an example of a partial frame update in accordance with one or more techniques of this disclosure.

FIG. 5 is a diagram 500 illustrating an example of a partial frame update 502 in accordance with one or more techniques of this disclosure. A partial frame update (which may also be referred to as a partial update) may refer to a MIPI DSI standard feature that supports updating region(s) of interest (ROI(s)) of a frame, as opposed to the entirety of a frame. A partial frame update may be a low power usage feature as the partial frame update may process an ROI of an image (as opposed to an entirety of the image), where the display processor and DSI lanes may be in low power mode.

In an example pertaining to the partial frame update 502, a device (e.g., the device 104, the display processor 127) may obtain a first frame 504 and a second frame 506, where the first frame 504 and the second frame 506 may be successive frames in a set of frames, that is, the first frame 504 may be displayed immediately prior to the second frame 506.

As illustrated in FIG. 5, the first frame 504 and the second frame 506 may be similar, but not identical to one another. In an example, the first frame 504 and the second frame 506 may both include trees 508; however, the second frame 506 may include a first vehicle 510 that is not present in the first frame 504. In order to conserve computing resources and/or power resources, the device may perform the partial frame update 502 with respect to the first frame 504 and the second frame 506, that is, the device may perform processing on a first ROI 512 of the second frame 506 that includes the first vehicle 510 while re-using the processing of non-ROIs of the first frame 504. When a partial frame update is performed with respect to a single ROI in a frame, the partial frame update may be referred to as a single partial frame update. In a further example, in addition to the first vehicle 510, the second frame 506 may also include a second vehicle 514 that is not present in the first frame 504. In order to conserve computing resources and/or power resources, the device may perform the partial frame update 502 with respect to the first frame 504 and the second frame 506, that is, the device may perform processing on the first ROI 512 of the second frame 506 that includes the first vehicle 510 and on a second ROI 516 of the second frame 506 that includes the second vehicle 514 while re-using the processing of non-ROIs of the first frame 504. When a partial frame update is performed with respect to more than one ROI in a frame, the partial frame update may be referred to as a multiple partial frame update (or as a multiple partial update).

Figure 6:
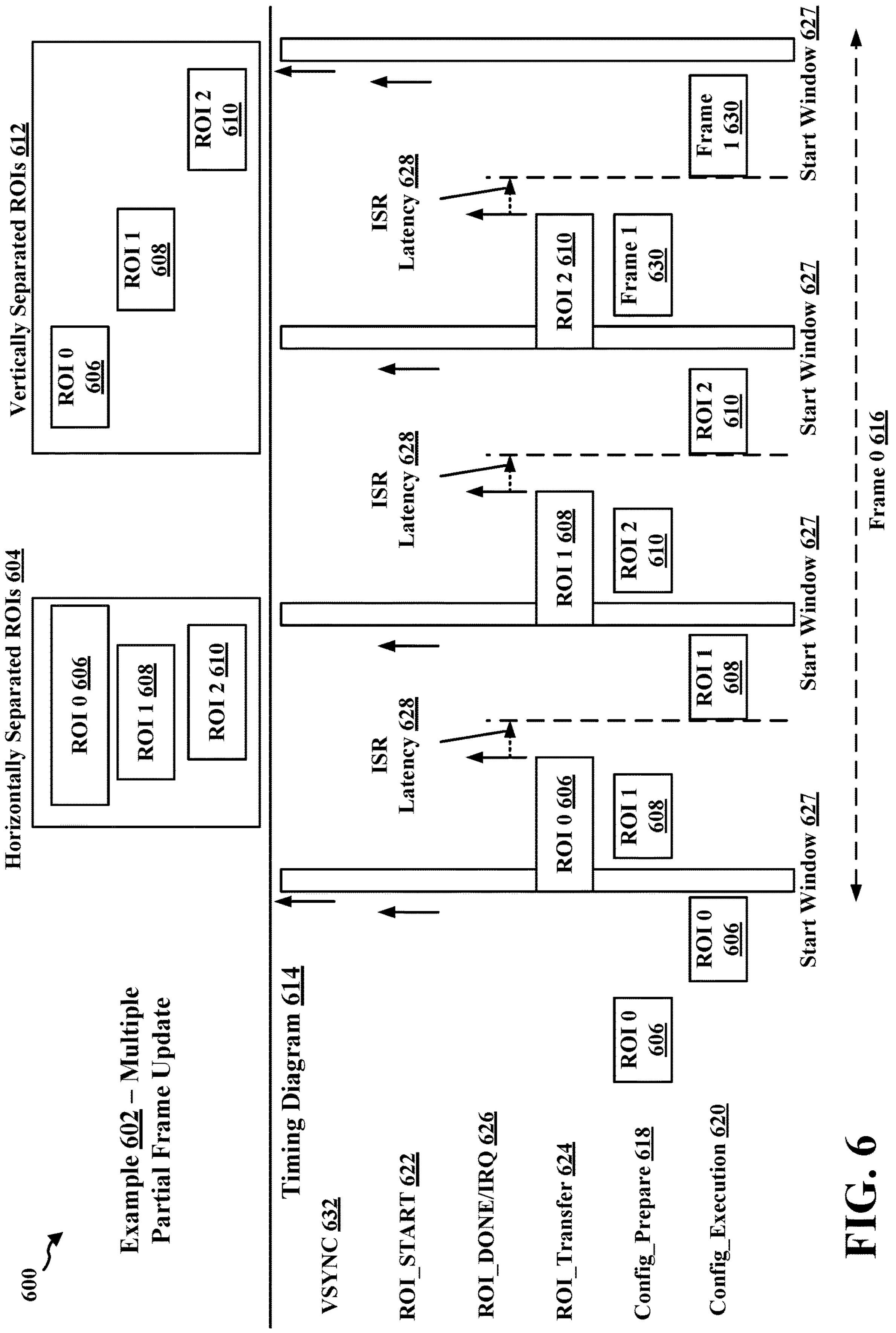
FIG. 6 is a diagram illustrating an example of a multiple partial frame update in accordance with one or more techniques of this disclosure.

FIG. 6 is a diagram 600 illustrating an example of a multiple partial frame update 602 in accordance with one or more techniques of this disclosure. As described above, a multiple partial frame update may involve updating multiple ROIs in a single frame. Each ROI may be processed in a time multiplexed manner. A display processor (e.g., the display processor 127, the display processor 404) may operate in a low power mode when processing each ROI of a frame. In one example, a frame may include horizontally separated ROIs 604, that is, a zeroth ROI 606, a first ROI 608, and a second ROI 610 may be horizontally separated in the frame. In another example, a frame may include vertically separated ROIs 612, that is, the zeroth ROI 606, the first ROI 608, and the second ROI 610 may be vertically separated in the frame.

The diagram 600 further depicts a timing diagram 614 representing three ROI updates (e.g., an update for the zeroth ROI 606, an update for the first ROI 608, and an update for the second ROI 610) for a zeroth frame 616. The display processor may prepare a configuration (referred to hereafter as "Config_Prepare 618") for the multiple partial frame update for the zeroth ROI 606. After the Config Prepare 618, the display processor may execute the configuration (referred to hereafter as "Config_Execution 620") for the zeroth ROI 606. The Config_Execution 620 for the zeroth ROI 606 may trigger an ROI start process (referred to hereafter as "ROI_START 622"). The ROI_START 622 may cause a region of interest data transfer (referred to hereafter as "ROI Transfer 624") with respect to the zeroth ROI 606. The ROI Transfer 624 may occur at the beginning of a start window 627. Upon completion of the ROI_Transfer 624, an interrupt service request (referred to hereafter as "ROI_DONE/IRQ 626") may be generated for the zeroth ROI 606. The ROI DONE/IRQ 626 for the zeroth ROI 606 may be serviced via interrupt servicing. Config Execution 620 for the first ROI 608 may not begin until the interrupt servicing is performed for the zeroth ROI 606, which may cause an interrupt servicing request (ISR) latency 628. The display processor may perform similar functionality as described above with respect to the first ROI 608 and the second ROI 610. The display processor may perform processing for a first frame 630 that follows the first frame upon the ROI Transfer 624 for the second ROI 610. The zeroth frame may also undergo a vertical synchronization (VSYNC 632).

Figure 7:
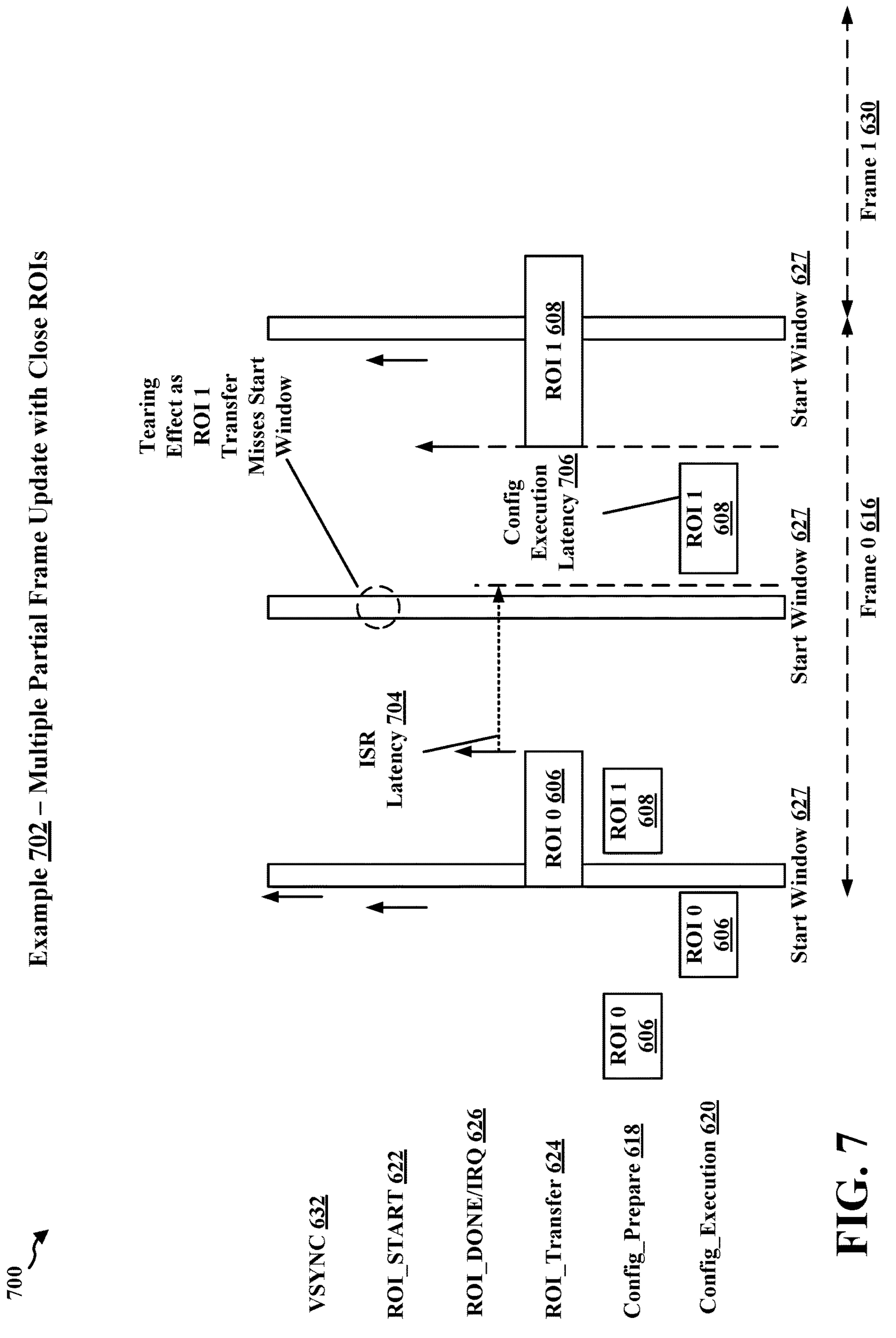
FIG. 7 is a diagram illustrating an example of a multiple partial frame update with close regions of interest (ROIs) in accordance with one or more techniques of this disclosure.

FIG. 7 is a diagram 700 illustrating an example 702 of a multiple partial frame update with close regions of interest (ROIs) in accordance with one or more techniques of this disclosure. As depicted in the example 702, when ROIs of a frame that is to undergo a multiple partial frame update are too close to one another, an ROI update may be missed due to ISR latency 704 and config execution latency 706 (i.e., configuration execution latency). As indicated above, Config Execution 620 for the first ROI 608 may not begin until the interrupt servicing is performed for the zeroth ROI 606, which may cause the ISR latency 704. The config execution latency 706 may be caused by a delay between the Config_Prepare 618 and the Config_Execution 620 for the first ROI 608. In the example 702, the ISR latency 704 for servicing (1) ROI_DONE/IRQ 626 for the zeroth ROI 606 and (2) the config execution latency 706 for the first ROI 608 may cause the first ROI 608 to miss the start window 627 for the ROI Transfer 624 for the first ROI 608. This may result in a tearing effect. Missing the start window 627 may restrict use of software to perform a multiple partial frame update.

FIG. 7 is a diagram 700 illustrating an example 702 of a multiple partial frame update with close regions of interest (ROIs) in accordance with one or more techniques of this disclosure. As depicted in the example 702, when ROIs of a frame that is to undergo a multiple partial frame update are too close to one another, an ROI update may be missed due to ISR latency 704 and config execution latency 706 (i.e., configuration execution latency). As indicated above, Config_Prepare 618 for the first ROI 608 may not begin until the interrupt servicing is performed for the zeroth ROI 606, which may cause the ISR latency 704. The config execution latency 706 may be caused by a delay between the Config_Prepare 618 and the Config_Execution 620 for the first ROI 608. In the example 702, the ISR latency 704 for servicing (1) ROI_DONE/IRQ 626 for the zeroth ROI 606 and (2) the config execution latency 706 for the first ROI 608 may cause the first ROI 608 to miss the start window 627 for the ROI_Transfer 624 for the first ROI 608. This may result in a tearing effect. Missing the start window 627 may restrict use of software to perform a multiple partial frame update.

Figure 8:
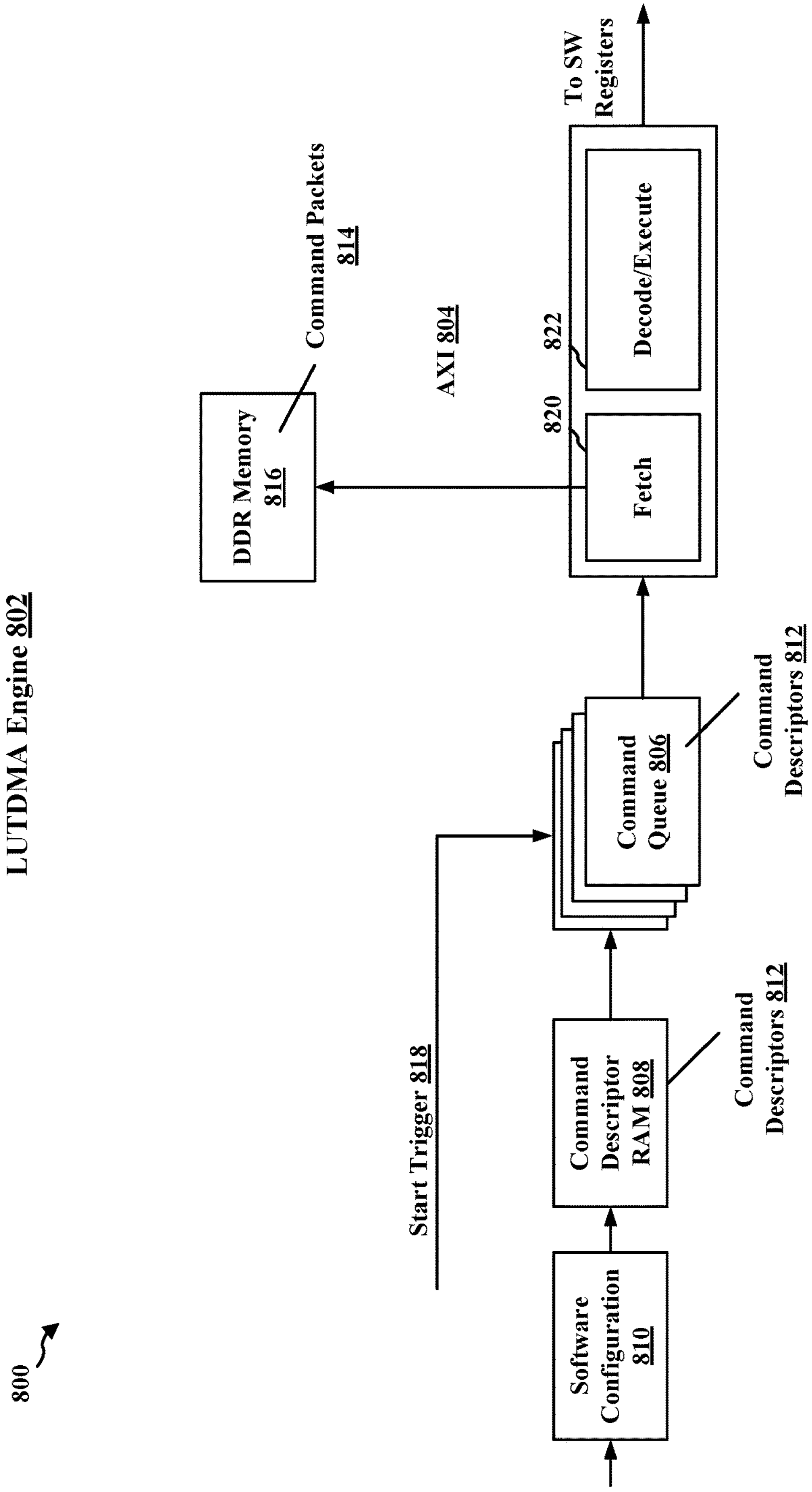
FIG. 8 is a diagram illustrating an example of a look-up table direct memory access (LUTDMA) engine in accordance with one or more techniques of this disclosure.

FIG. 8 is a diagram 800 illustrating an example of a look-up table direct memory access (LUTDMA) engine 802 in accordance with one or more techniques of this disclosure. The LUTDMA engine 802 may be included in the device 104. In general, the LUTDMA engine 802 may be responsible for configuring software registers (e.g., all software registers) within a display processor (e.g., the display processor 127, the display processor 404, etc.). The LUTDMA engine 802 may be a configuration accelerator that utilizes an Advanced extensible Interface (AXI) 804 to fetch software (SW) register data. The AXI 804 may refer to an on-chip communication bus protocol that is part of the Advanced Microcontroller Bus Architecture (AMBA) specification. The AXI 804 may be faster than an AHB interface.

The LUTDMA engine 802 may include or be associated with a command queue 806 and command descriptor random access memory (RAM) 808. In one aspect, the command queue 806 may be stored in the command descriptor RAM 808. A software configuration 810 may cause command descriptors 812 to be stored in the command descriptor RAM 808. The command descriptors 812 may define an address of and a number of the command packets 814 that are stored in DDR memory 816. The command packets 814 may include information about an operation code (OP-CODE), a block that is to be programmed to facilitate presentation of a frame (e.g., facilitate a partial frame update or a multiple partial frame update), and corresponding software register values. While stored in the DDR memory 816, the command packets 814 may be encoded. Aspects pertaining to the command descriptors 812 and the command packets 814 will be discussed in greater detail below. Upon reception of a start trigger 818, the LUTDMA engine 802 may store the command descriptors 812 in the command queue 806. Based on the command descriptors 812 stored in the command queue 806, at 820, the LUTDMA engine 802 may fetch (i.e., retrieve) the command packets 814 from the DDR memory 816. At 822, the LUTDMA engine 802 may decode the (fetched) command packets 814 and execute the (fetched) command packets 814. Executing the (fetched) command packets 814 may program registers associated with a frame (e.g., registers associated with a partial frame update, registers associated with a multiple partial frame update, etc.).

Figure 9:
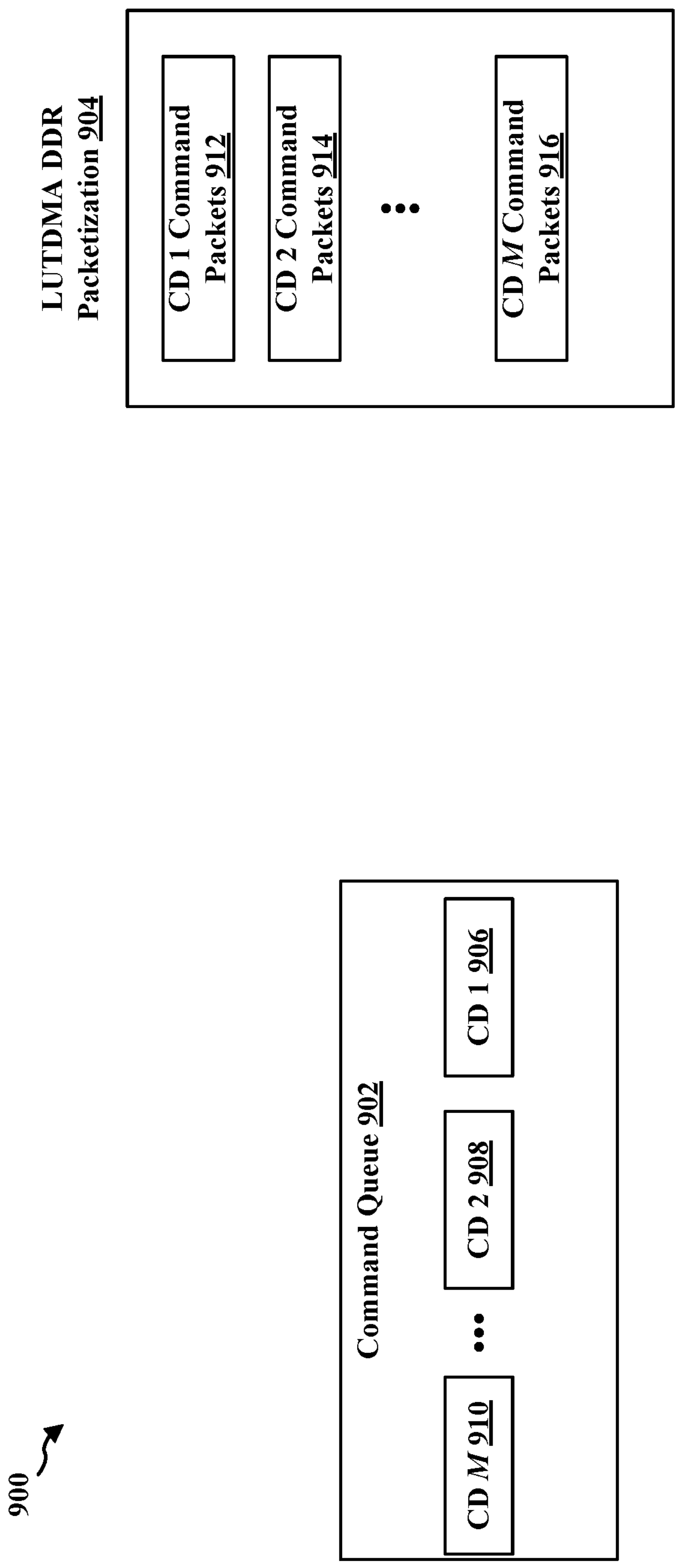
FIG. 9 is a diagram illustrating an example of a command queue and LUTDMA double data rate (DDR) packetization in accordance with one or more techniques of this disclosure.

FIG. 9 is a diagram 900 illustrating an example of a command queue 902 and LUTDMA DDR packetization 904 in accordance with one or more techniques of this disclosure. The command queue 902 may be or include the command queue 806. During a configuration preparation stage, the LUTDMA engine 802 may configure command descriptors (CDs) for blocks of a frame that are to undergo a software register update. The LUTDMA engine 802 may push the CDs (e.g., the command descriptors 812) to the command queue 902. A queue (e.g., the command queue 902) may refer to a first-in, first-out data structure. In an example, the command queue 902 may include a first command descriptor (CD) 906, a second CD 908, and an Mth CD 910, where M may be a positive integer greater than 2. In an example, the LUTDMA engine 802 may push the first CD 906 to the command queue 902, followed by the second CD 908, followed by the Mth CD 910. The LUTDMA engine 802 may execute the first CD 906, followed by the second CD 908, followed by the Mth CD 910.

During the configuration preparation stage, the LUTDMA engine 802 may also configure command packets (e.g., the command packets 814) and store the command packets in DDR memory (e.g., the DDR memory 816), where the command packet may correspond to the command descriptors. In an example, the LUTDMA engine 802 may configure and store, in DDR memory, first command packet (CPs) 912 for the first CD 906, second CPs 914 for the second CD 908, and Mth CPs 916 for the Mth CD 910.

When the LUTDMA engine 802 receives a start trigger, the LUTDMA engine 802 may execute CDs stored in the command queue 902. In one aspect, the start trigger may be software controlled. In one aspect, in a multiple partial frame update scenario, the LUTDMA engine 802 may be triggered via a software trigger for each ROI configuration update. For instance, if a frame includes a first ROI, a second ROI, and a third ROI, the LUTDMA engine 802 may receive a first software trigger for the first ROI, a second software trigger for the second ROI, and a third software trigger for the third ROI. Software based triggers may be associated with latency. Multiple software triggers for a frame may impact an ability of the LUTDMA engine 802 to perform a multiple partial frame update.

Figure 10:
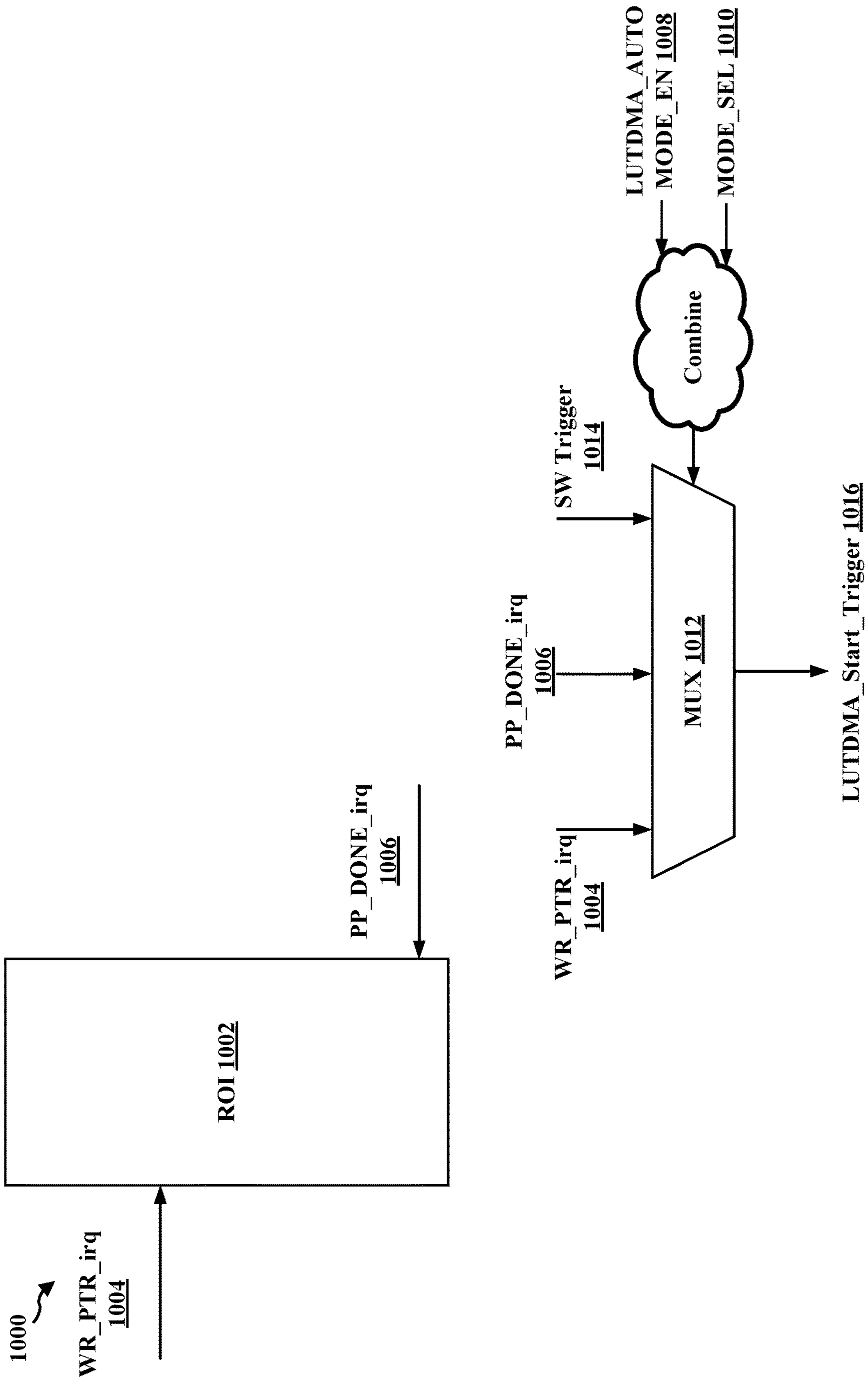
FIG. 10 is a diagram illustrating example aspects pertaining to hardware based LUTDMA triggering in accordance with one or more techniques of this disclosure.

FIG. 10 is a diagram 1000 illustrating example aspects pertaining to hardware based LUTDMA triggering in accordance with one or more techniques of this disclosure. In one aspect described herein, a first trigger for the LUTDMA engine 802 may be a software based trigger, that is, the first trigger may be software controlled. However, successive triggers (e.g., a second trigger, a third trigger, etc.) may be internally generated in hardware based on a region of interest done interrupt request (e.g., ROI_DONE_irq). Stated differently, the successive triggers may be hardware based triggers.

In one aspect, a hardware based trigger for an ROI 1002 for a frame may be a write pointer interrupt request (referred to hereafter as "WR_PTR_irq 1004"). The WR_PTR_irq 1004 may be generated once a counter (e.g., a write pointer counter, referred to hereafter as "WR_PTR_cntr") reaches a software programmable counter value. Stated differently, ROI_DONE_irq may be based on the WR_PTR_irq 1004.

In one aspect, a hardware based trigger for an ROI 1002 for a frame may be a ping pong buffer done interrupt request (referred to hereafter as "PP_DONE_irq 1006"). PP_DONE_irq 1006 may be generated once a last pixel of the ROI 1002 is removed (i.e., drained) from ping pong buffers. A ping pong buffer may refer to a double buffer. The ping pong buffers may be last pipeline buffers in a display processor (e.g., the display processor 127, the display processor 404). Stated differently, ROI_DONE_irq may be based on the PP_DONE_irq 1006. In one aspect, WR_PTR_irq 1004 may occur (i.e., be generated) prior to PP_DONE_irq 1006 occurring (i.e., prior to PP_DONE_irq 1006 being generated).

When the LUTDMA engine 802 is triggered for ROI updates via hardware triggers (e.g., WR_PTR_irq 1004, PP_DONE_irq 1006), the LUTDMA engine 802 may be said to be running in automode. A software register bit (i.e., "MODE_SEL") may indicate that the LUTDMA engine 802 is running in automode (which may also be referred to as AUTOMODE or AUTO_MODE). Table 1 below details aspects pertaining to automode.

TABLE 1

LUTDMA Engine Automode Registers

| Field Name | Bits | Description |
|---|---|---|
| LUTDMA_AUTOMODE_EN | 0 | LUTDMA engine running in automode without software triggers. The LUTDMA may be triggered via internal hardware triggers (based on ROI_DONE_irq) |
| PROGRAMMABLE_WR_PTR_COUNT | 17:1 | Software programmable counter value. When WR_PTR_cntr reaches this count value, WR_PTR_irq may be generated. |
| MODE_SEL | 18 | Defines the mode in which the next frame is triggered:<br>0x0: PP_DONE_irq<br>0x1: WR_PTR_irq |

In an example, a value (e.g., zero or one) of a LUTDMA_AUTOMODE_EN register 1008 may determine whether the LUTDMA engine 802 runs in automode. A value (e.g., zero or one) of a MODE_SEL register 1010 may determine which hardware based trigger (e.g., WR_PTR_irq 1004 or PP_DONE_irq 1006) is to be used for a next frame. Stated differently, during automode, the LUTDMA engine 802 may be triggered either by WR_PTR_irq 1004 or PP_DONE_irq 1006 based on a value of the MODE_SEL register 1010. To disable automode once all ROIs for a frame have been configured, a last command packet of a last ROI may include an indication that a value of the LUTDMA_AUTOMODE_EN register 1008 is to be set to zero. Once the LUTDMA engine 802 is out of automode, the LUTDMA engine 802 may be triggered via a software based trigger for a next frame.

In an example, the LUTDMA engine 802 may include a multiplexer (referred to hereafter as "MUX 1012"). The LUTDMA engine 802 may combine a value of the LUTDMA_AUTOMODE_EN register 1008 and a value of the MODE_SEL register 1010. The MUX 1012 may take, as input, at least one of WR_PTR_irq 1004, PP_DONE_irq 1006, a software (SW) trigger 1014, and the combined value of the LUTDMA_AUTOMODE_EN register 1008 and the MODE_SEL register 1010. Based on the input, the MUX 1012 may output a start trigger for the LUTDMA engine 802 (referred to hereafter as ("LUTDMA_Start_Trigger 1016").

Figure 11:
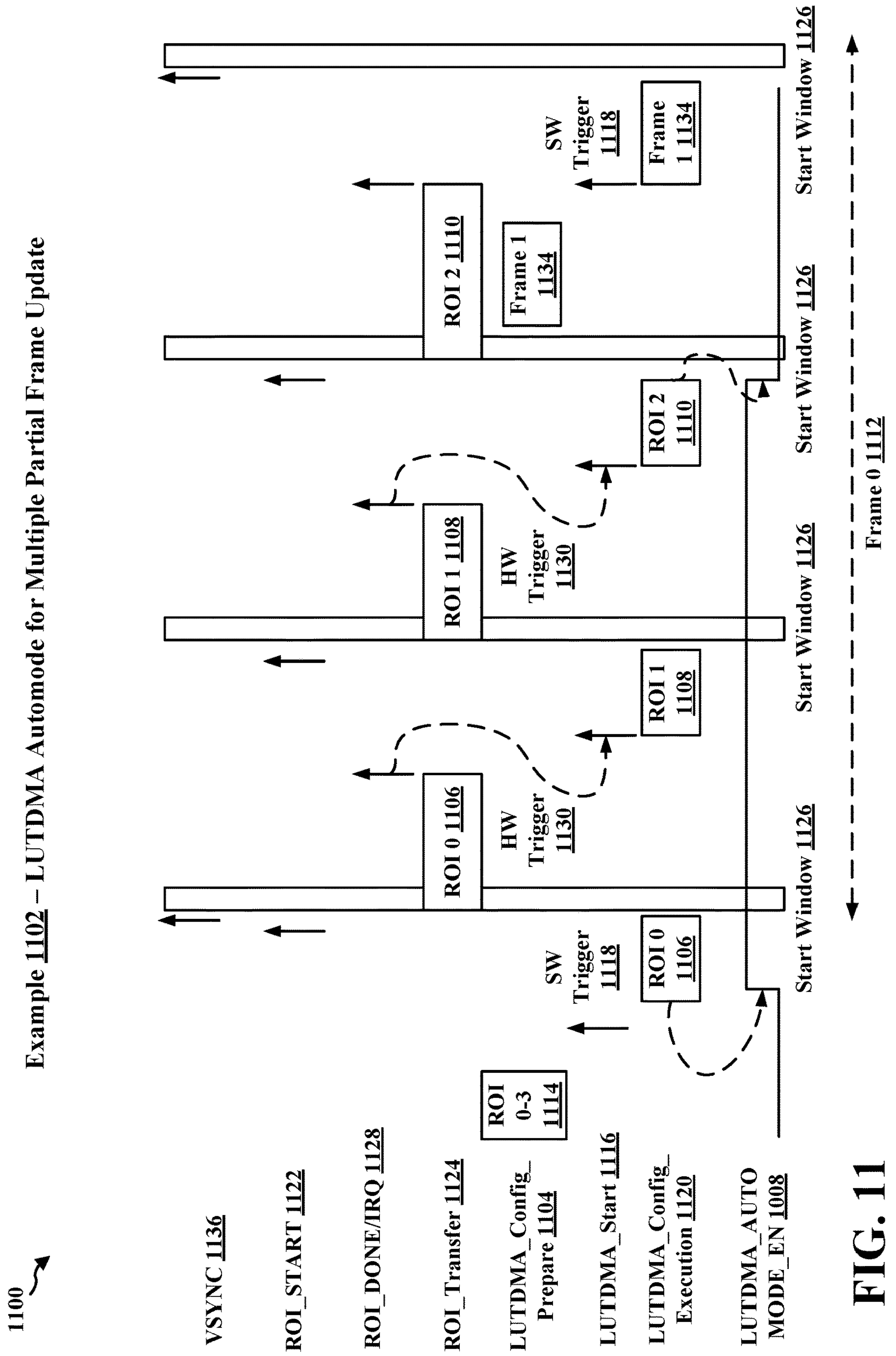
FIG. 11 is a diagram illustrating an example of LUTDMA automode for a multiple partial frame update in accordance with one or more techniques of this disclosure.

FIG. 11 is a diagram 1100 illustrating an example 1102 of LUTDMA automode for a multiple partial frame update in accordance with one or more techniques of this disclosure. During a LUTDMA configuration preparation stage (referred to hereafter as "LUTDMA_Config_Prepare 1104"), software associated with the LUTDMA engine 802 may prepare a LUTDMA configuration and LUTDMA DDR packets. For instance, the LUTDMA engine 802 may prepare command descriptors (e.g., the command descriptors 812) and command packets (e.g., the command packets 814) for the command descriptors for a zeroth ROI 1106, a first ROI 1108, and a second ROI 1110 of a zeroth frame 1112. The zeroth ROI 1106, the first ROI 1108, and the second ROI 1110 of the zeroth frame 1112 may be ROIs that are to undergo a multiple partial frame update. The zeroth ROI 1106, the first ROI 1108, and the second ROI 1110 of the zeroth frame 1112 may be collectively referred to as ROI 0-3 1114. During a LUTDMA start stage (referred to hereafter as "LUTDMA_Start 1116"), the LUTDMA engine 802 may receive a software trigger 1118, where the software trigger 1118 may be generated by software associated with the LUTDMA engine 802. The software trigger 1118 may cause the LUTDMA engine 802 to configure registers for the zeroth ROI 1106 during a LUTDMA configuration execution stage (referred to hereafter as "LUTDMA_Config_Execution 1120"). A command packet associated with the zeroth ROI 1106 may enable LUTDMA automode. For example, a value of the LUTDMA_AUTOMODE_EN register 1008 may be set to one to enable automode. The LUTDMA_Config_Execution 1120 may cause an ROI start stage (referred to hereafter as "ROI_START 1122"). The ROI_START 1122 may cause the LUTDMA engine 802 to transfer region of interest data associated with the zeroth ROI 1106 during an ROI transfer stage (referred to hereafter as "ROI_Transfer 1124"), where the transfer may occur at a start window 1126. With more particularity, the region of interest data may be transferred from DDR memory (e.g., the DDR memory 816) to a frame buffer in a display driver integrated circuit (DDIC). Upon completion of the ROI_Transfer 1124 for the zeroth ROI 1106, the LUTDMA engine 802 may generate an interrupt service request (referred to hereafter as "ROI_DONE/IRQ 1128") for the zeroth ROI 1106. ROI_DONE/IRQ 1128 may further trigger the LUTDMA engine 802 for a next ROI register configuration (e.g., a register configuration for the first ROI 1108). ROI_DONE/IRQ 1128 may include/be associated with a hardware trigger 1130 generated by the LUTDMA engine 802. The zeroth frame 1112 may also undergo a vertical synchronization (VSYNC 1136). Based on the hardware trigger 1130, the LUTDMA engine 802 may process the first ROI 1108 and the second ROI 1110 in a manner similar to that described above. As the second ROI 1110 may be a last ROI for the zeroth frame 1112, a last command packet for the second ROI 1110 may disable automode for the LUTDMA engine 802. A first frame 1134 that occurs subsequent to the zeroth frame 1112 may be processed based on a software trigger 1118.

Figure 12:
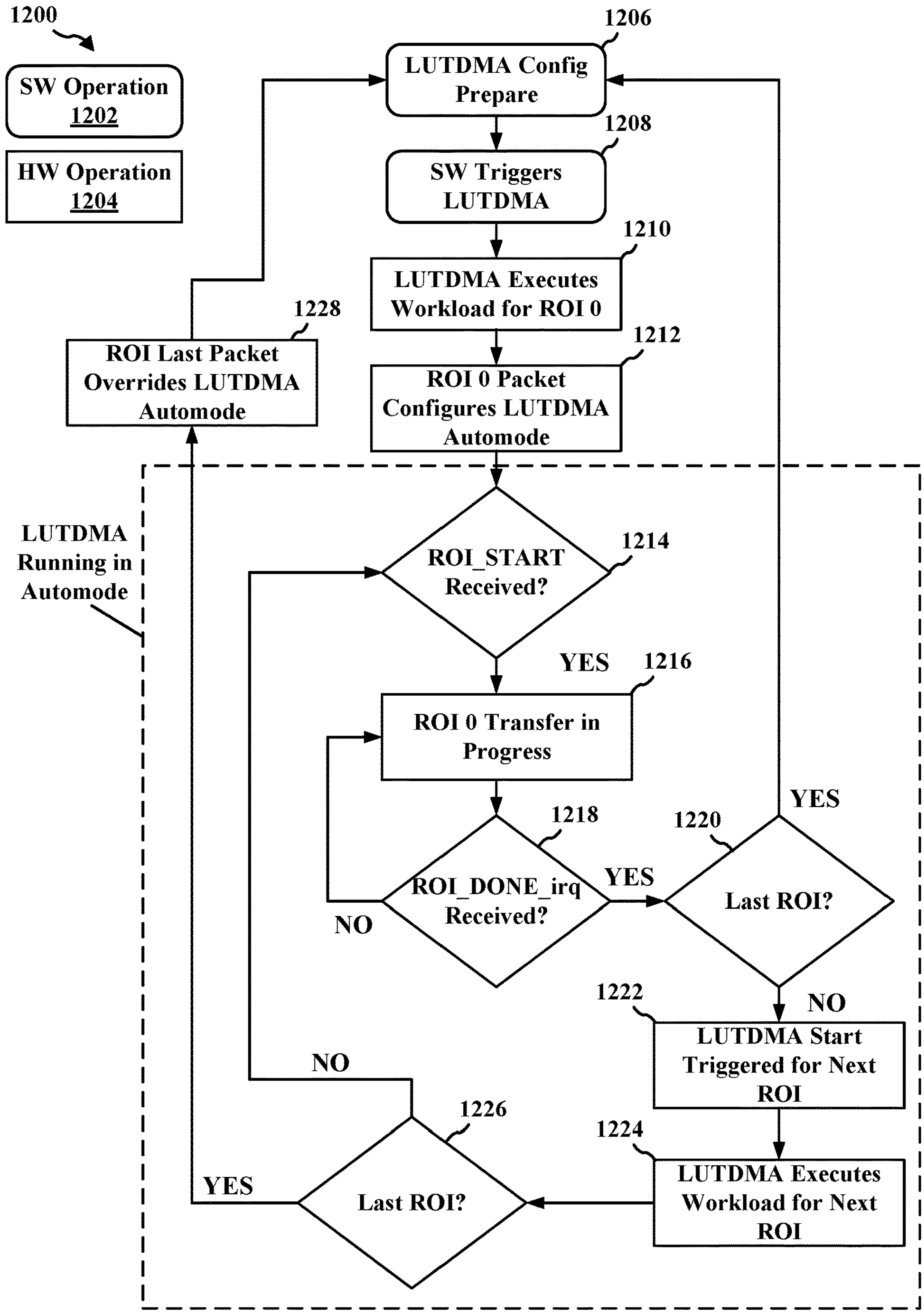
FIG. 12 is a diagram illustrating an example flow pertaining to LUTDMA automode in accordance with one or more techniques of this disclosure.

FIG. 12 is a diagram 1200 illustrating an example flow pertaining to LUTDMA automode in accordance with one or more techniques of this disclosure. In the example, SW operations 1202 are indicated by boxes with rounded corners and HW operations 1204 are indicated by boxes with pointed corners. The example may pertain to FIGS. 8-11 as described above.

At 1206, during a LUTDMA configuration preparation stage, software associated with the LUTDMA engine 802 may configure CDs and CPs for each ROI of a frame. At 1208, the software associated with the LUTDMA engine 802 may trigger the LUTDMA engine 802. At 1210, hardware of the LUTDMA engine 802 may execute workloads for a zeroth ROI (ROI 0). For instance, the hardware of the LUTDMA engine 802 may execute a CD for the zeroth ROI and the hardware may update configurations related to the zeroth ROI. At 1212, a CP associated with the zeroth ROI may configure LUTDMA automode (e.g., LUTDMA_AUTOMODE_EN=1), which may cause the LUTDMA engine 802 to operate in automode as described above.

At 1214, the LUTDMA engine 802 may determine whether an indication of ROI START has been received. Upon positive determination, at 1216, the hardware of the LUTDMA engine 802 may transfer region of interest data associated with the zeroth ROI. At 1218, the hardware of the LUTDMA engine 802 may determine whether ROI_DONE_irq has been received. Upon negative determination, the hardware of the LUTDMA engine 802 may return to 1216. Upon positive determination, at 1220, the hardware of the LUTDMA engine 802 may determine whether a current ROI is a last ROI for a frame (e.g., based on a last CP associated with the current ROI). Upon positive determination, the LUTDMA engine 802 may return to 1206. Upon negative determination, at 1222, a LUTDMA start may be triggered (e.g., via a hardware based trigger) for a next ROI of the frame. At 1224, the hardware of the LUTDMA engine 802 may execute workloads for the next ROI. For instance, the hardware of the LUTDMA engine 802 may execute a CD for the next ROI and the hardware may update configurations related to the next ROI.

At 1226, the hardware of the LUTDMA engine 802 may determine whether a current ROI is a last ROI for the frame (e.g., based on a last CP associated with the current ROI). Upon negative determination, the LUTDMA engine 802 may return to 1214. Upon positive determination, at 1228, a last CP of the current ROI may override LUTDMA automode (e.g., LUTDMA_AUTOMODE_EN=0). The LUTDMA engine 802 may then return to 1206.

Figure 13:
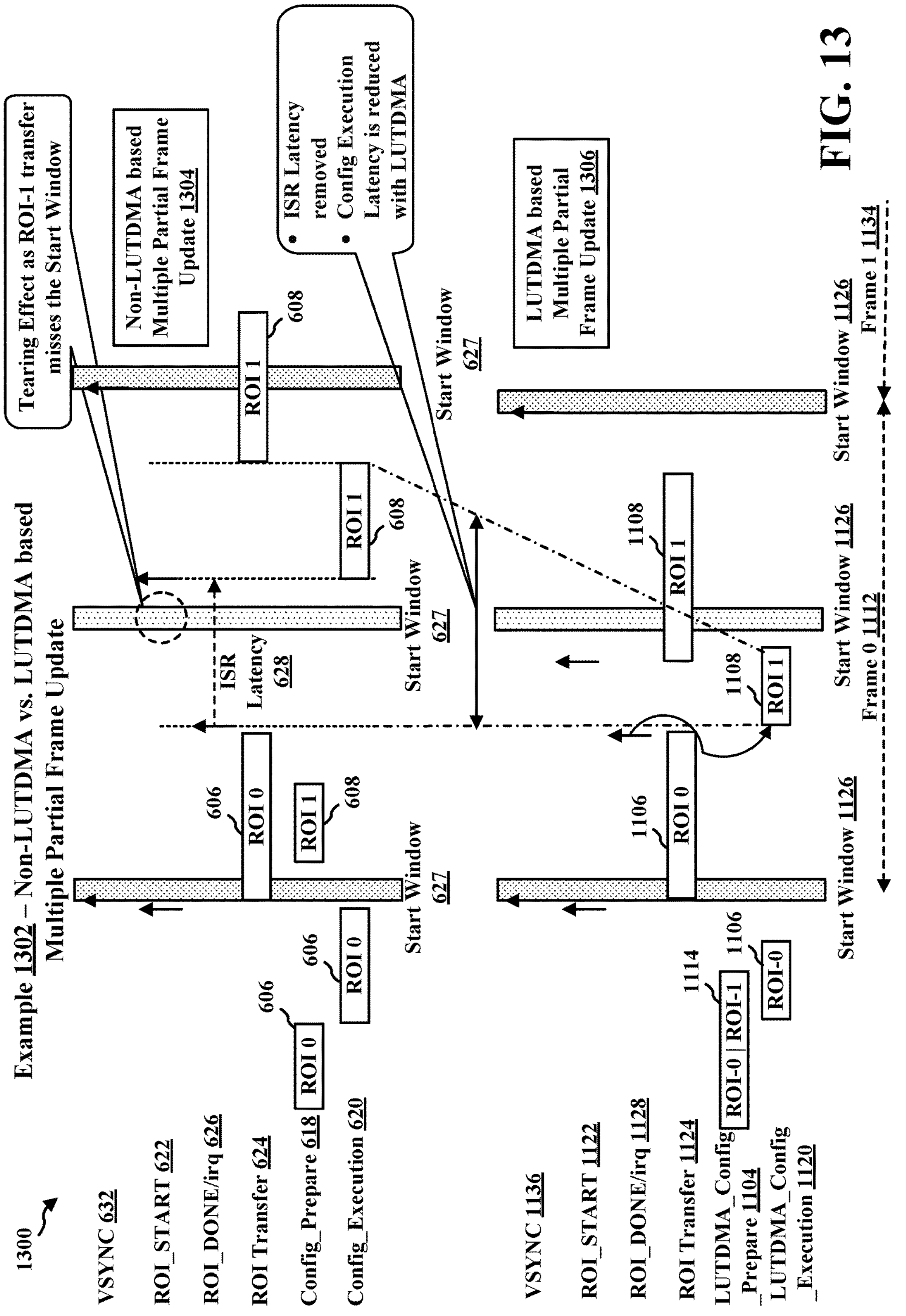
FIG. 13 is a diagram illustrating an example of a non-LUTDMA based multiple partial frame update vs. a LUTDMA based multiple partial frame update in accordance with one or more techniques of this disclosure.

FIG. 13 is a diagram 1300 illustrating an example 1302 of a non-LUTDMA based multiple partial frame update 1304 vs. a LUTDMA based multiple partial frame update 1306 in accordance with one or more techniques of this disclosure. As illustrated in the diagram 1300, the non-LUTDMA based multiple partial frame update 1304 may be associated with a tearing effect as the first ROI 608 misses the start window 627. In contrast, in the LUTDMA based multiple partial frame update 1306, the ISR latency 628 may be removed (or mitigated) and config execution latency may be reduced via LUTDMA.

Figure 14:
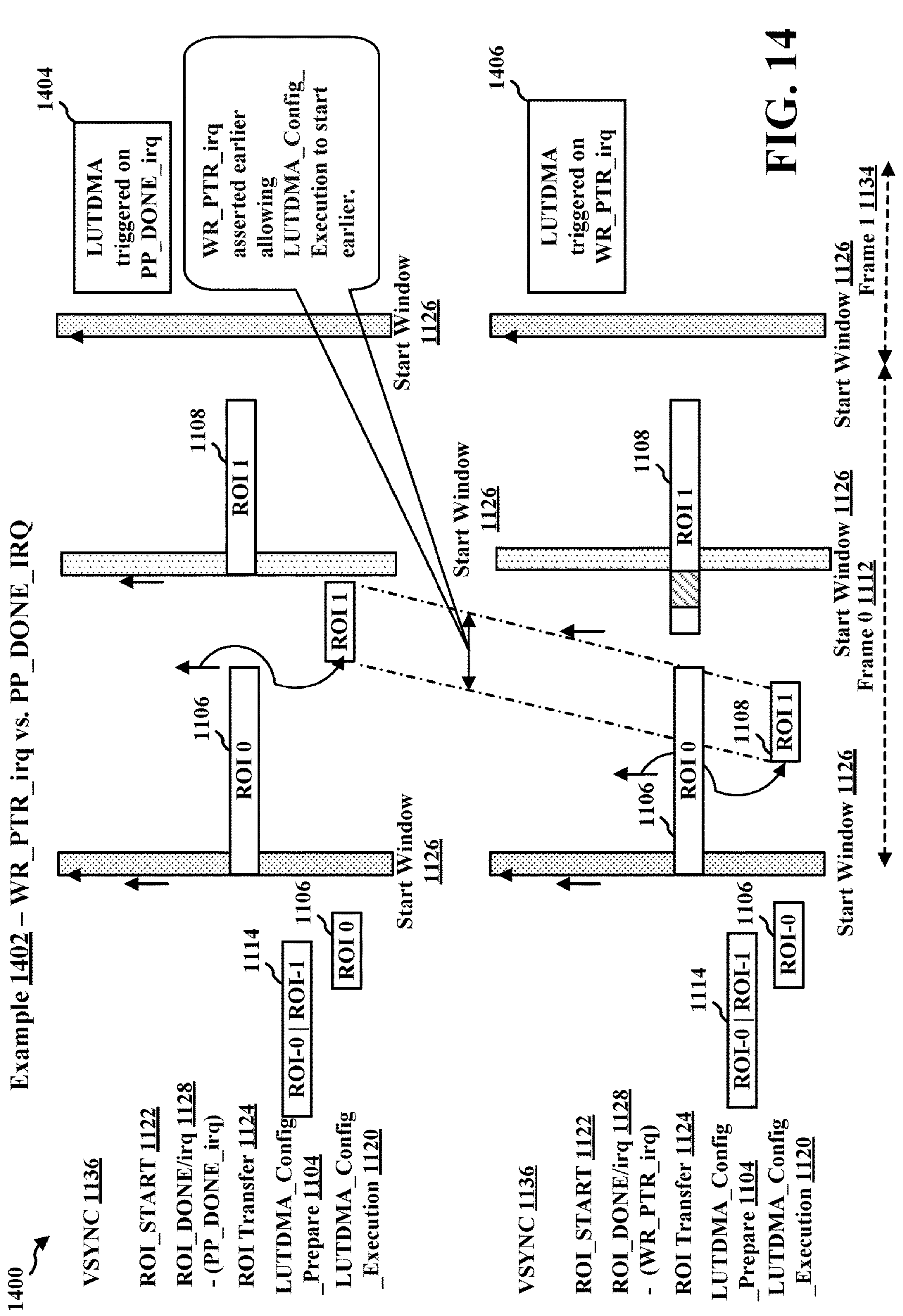
FIG. 14 is a diagram illustrating an example of a ping pong done interrupt request (PP_DONE_irq) hardware based LUTDMA trigger vs. a write pointer interrupt request (WR_PTR_irq) hardware based LUTDMA trigger in accordance with one or more techniques of this disclosure.

FIG. 14 is a diagram 1400 illustrating an example 1402 of a PP_DONE_irq hardware based LUTDMA trigger 1404 vs. a WR_PTR_irq hardware based LUTDMA trigger 1406 in accordance with one or more techniques of this disclosure. As illustrated in the diagram 1400, WR_PTR_irq may be asserted earlier than PP_DONE_irq, thus allowing LUTDMA_Config_Execution to begin earlier.

As described above, the technologies described herein may be associated with various advantages. First, the technologies described herein may provide for the ability to stack ROI configurations (e.g., all ROI configurations) for a frame by software at the beginning of the frame. Second, the technologies described herein may provide for the ability to auto-trigger a LUTDMA accelerator (e.g., the LUTDMA engine 802) multiple times in a single frame duration based on display timing. Third, the technologies described herein may provide for the ability to enter and exit automode for the LUTDMA dynamically based on a display frame boundary. Fourth, the technologies described herein may provide for the ability to deterministically trigger an ROI frame transfer within a start window.

As noted above, some systems for multiple partial frame updates may be impacted by configuration execution latencies and/or ISR latencies. Such latencies may prevent a multiple partial frame update from occurring when ROIs of a frame are within a threshold of one another. The LUTDMA engine 802 may be a faster engine than an AHB interface. The LUTDMA engine 802 may program ROI configurations faster than an AHB interface and thus the LUTDMA engine 802 may reduce configuration execution latency. The LUTDMA engine 802 may remove or mitigate ISR latency as the LUTDMA engine 802 prepares packets for ROIs at the beginning of a frame. Thus, the LUTDMA engine may not wait for ISR latency before the LUTDMA engine 802 configures a next ROI for the frame. Since the LUTDMA engine 802 may be able to reduce latency associated with a multiple partial frame update, the LUTDMA engine 802 may facilitate successful performance of multiple partial frame updates.

Figure 15:
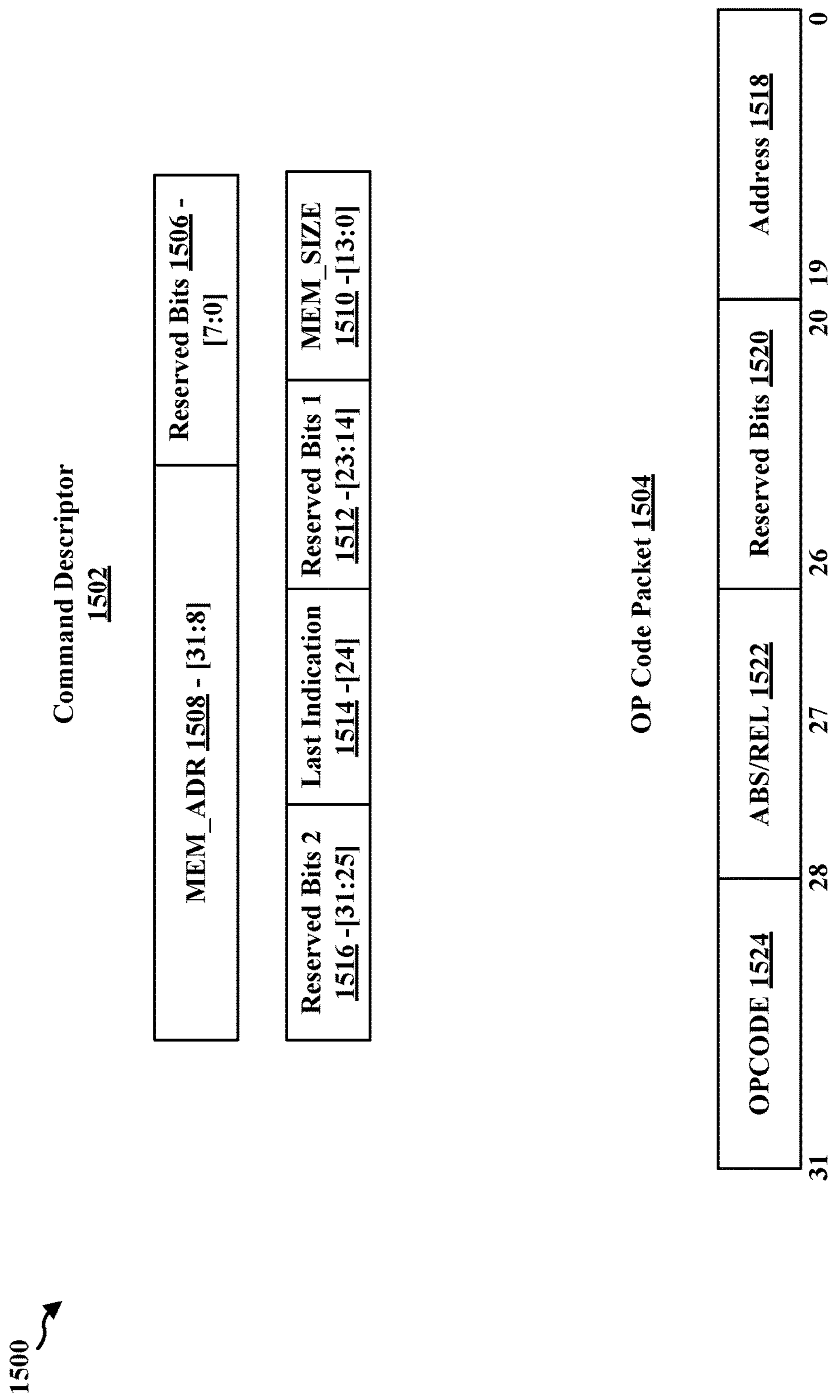
FIG. 15 is a diagram illustrating an example of a command descriptor and an operation code packet in accordance with one or more techniques of this disclosure.

FIG. 15 is a diagram 1500 illustrating an example of a command descriptor 1502 and an operation (OP) code packet 1504 in accordance with one or more techniques of this disclosure. In an example, the command descriptor 1502 may be a command descriptor in the command descriptors 812. The command descriptor 1502 may include a first portion and a second portion. The first portion may include 32 bits. The first portion may include reserved bits 1506 (e.g., bits [7:0] of the first portion). The first portion may include a memory address (referred to hereafter as "MEM ADDR 1508"). The MEM_ADDR 1508 may be an external DDR memory location (e.g., a location in the DDR memory 816) where command packets (e.g., the command packets 814) are stored. The MEM_ADDR 1508 may be a 256 byte aligned address. The MEM_ADDR may be bits [31:8] of the first portion.

The second portion may also include 32 bits. The second portion may include an indication of a memory size (referred to hereafter as "MEM_SIZE 1510"). The MEM SIZE 1510 may be a memory size in double words (DWORDs) that describe how many command packets are to be fetched from DDR memory. The MEM SIZE 1510 may be bits [13:0] of the second portion. The second portion may include first reserved bits 1512. The first reserved bits 1512 may be bits [23:14] of the second portion. The second portion may include a last indication 1514. The last indication 1514 may indicate, from software to hardware, that all command descriptors for a next frame have been programmed. The last indication 1514 may be bit of the second portion. The second portion may include second reserved bits 1516. The second reserved bits 1516 may be bits [31:25] of the second portion.

In one aspect, software associated with the LUTDMA engine 802 may configure command descriptors via AHB register programming. Based on a command descriptor, hardware of the LUTDMA engine 802 may fetch command packets and OP codes from external DDR memory through an AXI. Hardware of the LUTDMA engine 802 may decode an OPCODE and command packets in order to update software registers across blocks associated with a frame.

The OP code packet 1504 may be 32 bits. The OP code packet 1504 may be present in DDR memory in the format depicted in the diagram 1500. The OP code packet 1504 may include an address 1518 of a hardware register. The address 1518 may be bits [19:0] of the OP code packet 1504. The OP code packet 1504 may include reserved bits 1520. The reserved bits 1520 may be bits [26:20] of the OP code packet 1504. The OP code packet 1504 may include an absolute/relative indication (referred to hereafter as "ABS/REL 1522"). The ABS/REL 1522 may indicate whether the address is a relative address or an absolute address. The ABS/REL 1522 may be bit [27] of the OP code packet 1504. The OP code packet 1504 may include an operation code (OPCODE) 1524. Details pertaining to the OPCODE 1524 are described in Table 2 below. The OPCODE 1524 may be bits [31:28] of the OP code packet 1504.

TABLE 2

Supported OPCODEs

| Operation | Code | Function Description |
|---|---|---|
| NOP | 0000 | No operation |
| REG_Write | 0001 | Writes single 32-bit data to a single register address |
| REG_Modify | 0010 | Reads and modifies a single register. Mask value followed by a data value. |
| REG_BLK_WRITE_SINGLE | 0011 | Block of data write to a single address (hardware indexed) |
| REG_BLK_WRITE_INC | 0100 | Block of data write to an auto-incremented address (base address defined in control fields) |
| REG_BLK_WRITE_MULTIPLE | 0101 | Block of data write to a non-sequential address |
| REG_BLK_LUT_WRITE | 0110 | Lookup Table (LUT) mode opcode added for faster lookups |
| Reserved | 0111-1XXX | Reserved for future function |

Referring to Table 2 above, REG_WRITE may be an OPCODE operation for a single register write address, where the address specifies a register address in a decode space and where data specifies content to be written into a hardware register. REG_MODIFY may be an OPCODE operation for modifying specific fields of a register through a mask value. REG_BLK_WRITE_SINGLE may be an OPCODE operation for writing into index based LUTs. REG_BLK_WRITE_INC may be an OPCODE operation for writing into direct addressed LUTs.

Figure 16:
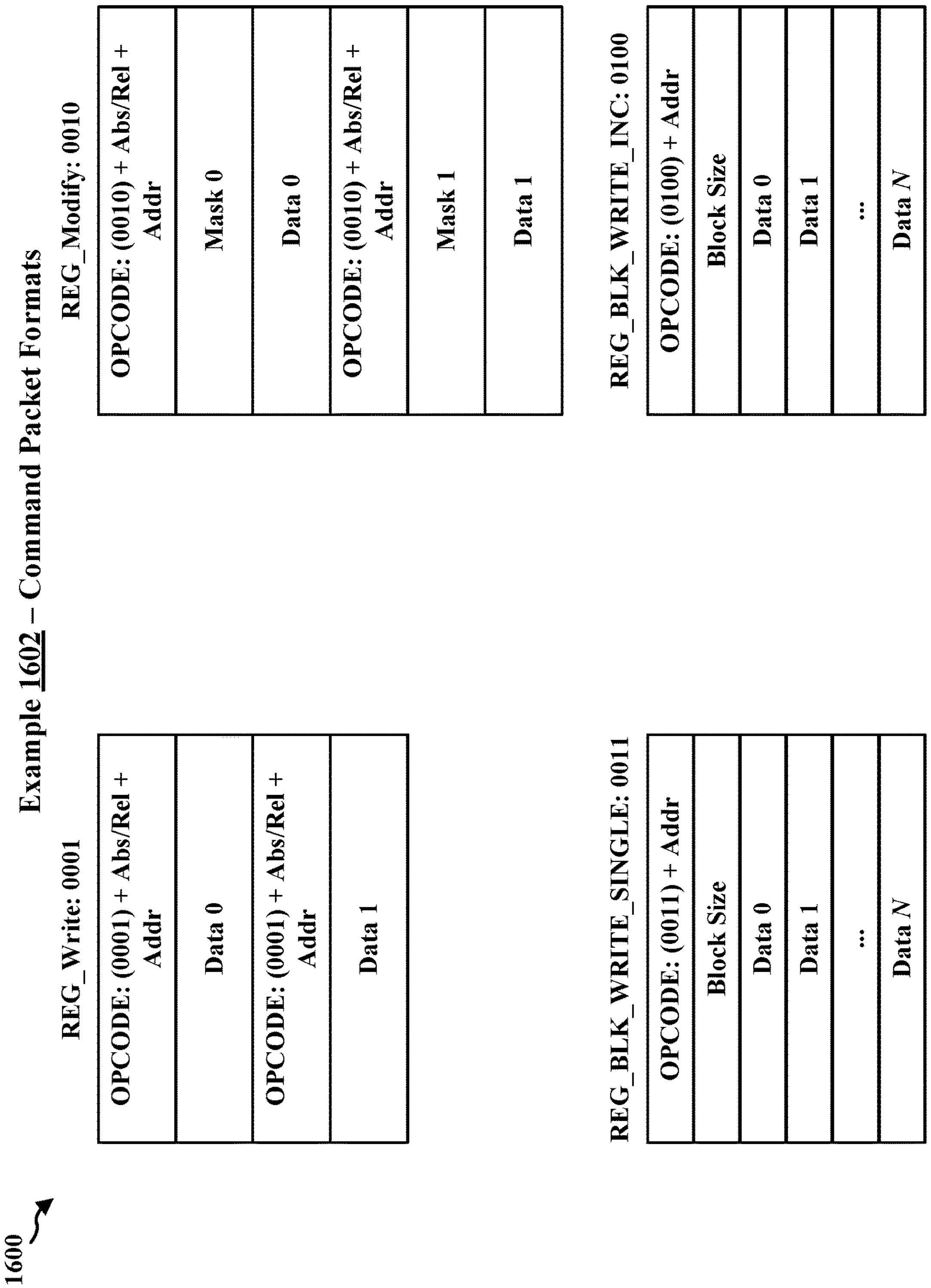
FIG. 16 is a diagram illustrating an example of command packet formats in accordance with one or more techniques of this disclosure.

FIG. 16 is a diagram 1600 illustrating an example 1602 of command packet formats in accordance with one or more techniques of this disclosure. The command packet formats may pertain to Table 2 above.

Figure 17:
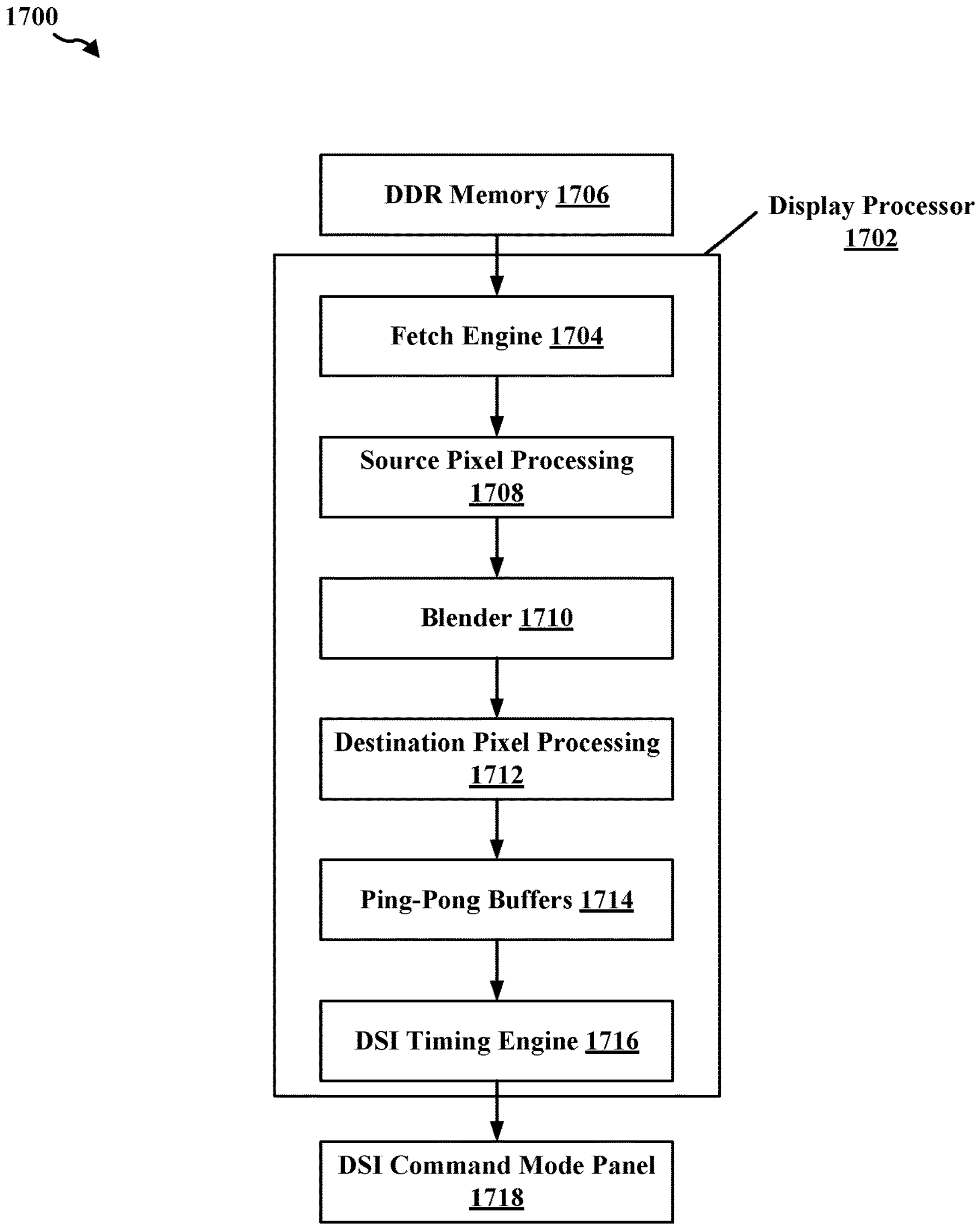
FIG. 17 is a diagram illustrating example aspects pertaining to a display processor in accordance with one or more techniques of this disclosure.

FIG. 17 is a diagram 1700 illustrating example aspects pertaining to a display processor 1702 in accordance with one or more techniques of this disclosure. In an example, the display processor 1702 may be the display processor 127 or the display processor 404. A fetch engine 1704 of the display processor 1702 may fetch image ROIs from DDR memory 1706 (e.g., the DDR memory 816). The display processor 1702 may perform source pixel processing 1708 (e.g., scaling, enhancement, etc.) on the fetched ROIs. A blender 1710 of the display processor 1702 may blend ROIs that have been processed via the source pixel processing 1708 (i.e., ROIs coming from source pipes) to produce final ROIs. The display processor 1702 may perform destination pixel processing 1712 on the final ROIs. The display processor 1702 may then store the (processed) final ROIs in ping-pong buffers 1714. The ping-pong buffers 1714 may be latency buffers. A DSI timing engine 1716 of the display processor 1702 may keep track of frame boundaries. The display processor 1702 may transfer the final ROIs in the ping-pong buffers 1714 to a DSI command mode panel 1718 (e.g., the MIPI DSI command mode display 410, the display(s) 131, etc.).

Figure 18:
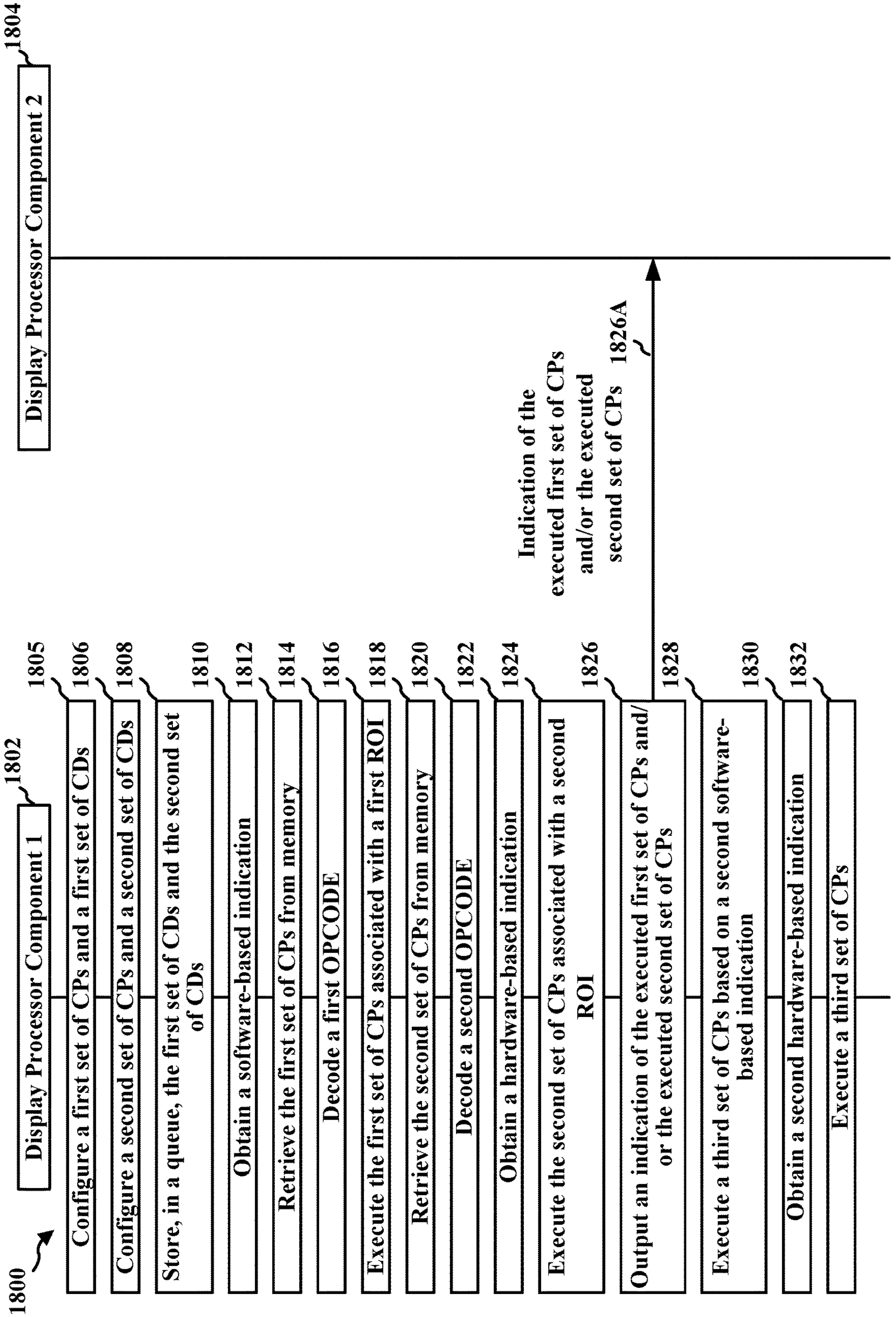
FIG. 18 is a call flow diagram illustrating example communications between a first display processor component and a second display processor component in accordance with one or more techniques of this disclosure.

FIG. 18 is a call flow diagram 1800 illustrating example communications between a first display processor component 1802 and a second display processor component 1804 in accordance with one or more techniques of this disclosure. In an example, the first display processor component 1802 and/or the second display processor component 1804 may be included in the device 104. In an example, the first display processor component 1802 and/or the second display processor component 1804 may be or include the LUTDMA engine 802.

At 1810, the first display processor component 1802 may obtain a software-based indication that indicates to start an execution of command packets. At 1816, the first display processor component 1802 may execute, based on the obtained software-based indication at 1810, a first set of command packets associated with a first region of interest (ROI) of a frame that is to be updated. At 1822, the first display processor component 1802 may obtain a hardware-based indication that indicates that the first set of command packets associated with the first ROI of the frame has been executed. At 1824, the first display processor component 1802 may execute, based on the obtained hardware-based indication at 1822, a second set of command packets associated with a second ROI of the frame that is to be updated.

At 1805, the first display processor component 1802 may configure, prior to the execution of the first set of command packets at 1816, the first set of command packets and a first set of command descriptors for the first set of command packets. At 1806, the first display processor component 1802 may configure, prior to the execution of the second set of command packets at 1824, the second set of command packets and a second set of command descriptors for the second set of command packets. At 1808, the first display processor component 1802 may store, in a queue, the first set of command descriptors and the second set of command descriptors, where executing the first set of command packets at 1816 may include executing the first set of command packets based on the first set of command descriptors, and where executing the second set of command packets at 1824 may include executing the second set of command packets based on the second set of command descriptors.

At 1812, the first display processor component 1802 may retrieve, from memory, the first set of command packets based on the stored first set of command descriptors stored at 1808. At 1818, the first display processor component 1802 may retrieve, from the memory, the second set of command packets based on the stored second set of command descriptors stored at 1808.

In one aspect, a command packet in the second set of command packets may indicate that the second ROI is a last ROI for the frame, and at 1828, the first display processor component 1802 may execute, based on a second obtained software-based indication, a third set of command packets associated with an ROI of a second frame that is to be updated.

In one aspect, the first set of command packets includes a first operation code (OPCODE) and the second set of command packets includes a second OPCODE, and at 1814, the first display processor component 1802 may decode the first OPCODE, where configuring the first set of registers includes configuring the first set of registers based on the decoded first OPCODE. At 1820, the first display processor component 1802 may decode the second OPCODE, where configuring the second set of registers includes configuring the second set of registers based on the decoded second OPCODE.

At 1830, the first display processor component 1802 may obtain a second hardware-based indication that indicates that the second set of command packets associated with the second ROI of the frame has been executed. At 1832, the first display processor component 1802 may execute, based on the obtained second hardware-based indication at 1830, a third set of command packets associated with a third ROI of the frame that is to be updated.

At 1826, the first display processor component 1802 may output an indication of at least one of the executed first set of command packets or the executed second set of command packets. For instance, at 1826A, the first display processor component 1802 may transmit (e.g., to the second display processor component 1804) the indication of at least one of the executed first set of command packets or the executed second set of command packets.

Figure 19:
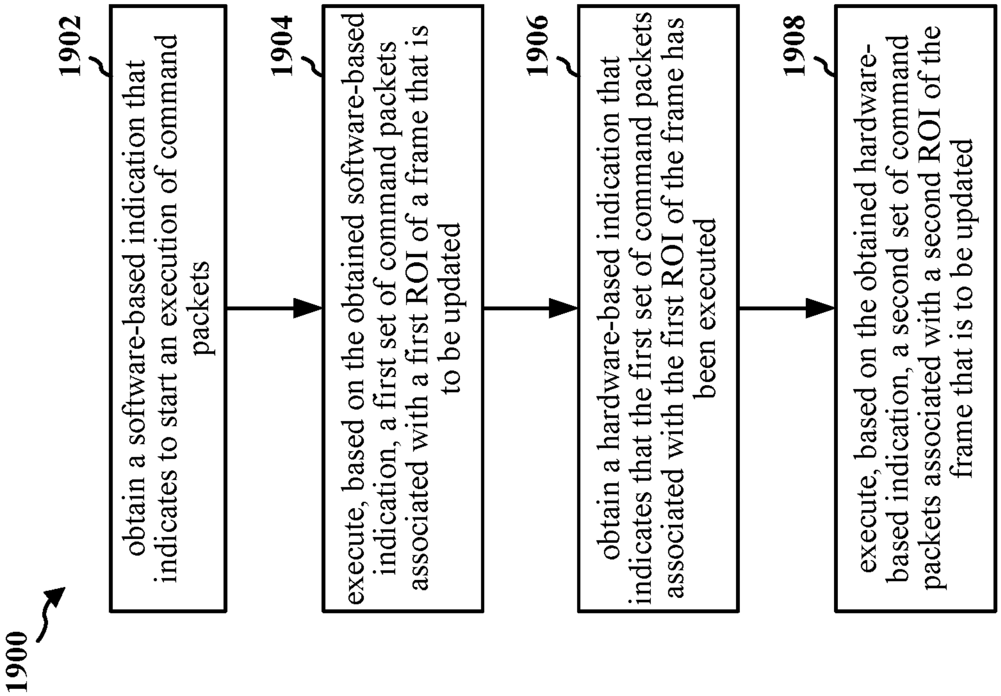
FIG. 19 is a flowchart of an example method of display processing in accordance with one or more techniques of this disclosure.

FIG. 19 is a flowchart 1900 of an example method of display processing in accordance with one or more techniques of this disclosure. The method may be performed by an apparatus, such as an apparatus for display processing, a display processing unit (DPU) or other display processor, the device 104, a wireless communication device, the LUT-DMA engine 802, and the like, as used in connection with the aspects of FIGS. 1-18. The method may be associated with various advantages, such as reducing latency associated with a multiple partial frame update. In an example, the method (including the various aspects detailed below) may be performed by the multiple partial frame updater 198.

At 1902, the apparatus obtains a software-based indication that indicates to start an execution of command packets. For example, FIG. 18 at 1810 shows that the first display processor component 1802 may obtain a software-based indication that indicates to start an execution of command packets. In an example, the software-based indication may be the software trigger 1118. In an example, the command packets may be the command packets 814. In an example, the command packets may be associated with the example 1602 in FIG. 16. In an example, obtaining the software-based indication may correspond to 1214 in FIG. 12. In an example, 1902 may be performed by the multiple partial frame updater 198.

At 1904, the apparatus executes, based on the obtained software-based indication, a first set of command packets associated with a first region of interest (ROI) of a frame that is to be updated. For example, FIG. 18 at 1816 shows that the first display processor component 1802 may execute, based on the obtained software-based indication, a first set of command packets associated with a first region of interest (ROI) of a frame that is to be updated. In an example, the first ROI of the frame may be the zeroth ROI 1106. In an example, the first set of command packets may be the first CPs 912. In an example, the frame that is to be updated may pertain to the first frame 504 being updated to the second frame 506. In an example, 1904 may be performed by the multiple partial frame updater 198.

At 1906, the apparatus obtains a hardware-based indication that indicates that the first set of command packets associated with the first ROI of the frame has been executed. For example, FIG. 18 at 1822 shows that the first display processor component 1802 may obtain a hardware-based indication that indicates that the first set of command packets associated with the first ROI of the frame has been executed. In an example, the hardware-based indication may be the hardware trigger 1130. In an example, 1906 may be performed by the multiple partial frame updater 198.

At 1908, the apparatus executes, based on the obtained hardware-based indication, a second set of command packets associated with a second ROI of the frame that is to be updated. For example, FIG. 18 at 1824 shows that the first display processor component 1802 may execute, based on the obtained hardware-based indication, a second set of command packets associated with a second ROI of the frame that is to be updated. In an example, the second set of command packets may be the second CPs 914. In an example, the second ROI of the frame may be the first ROI 1108. In an example, 1908 may be performed by the multiple partial frame updater 198.

In one aspect, the first ROI of the frame and the second ROI of the frame may be associated with a partial frame update of the frame. In an example, a partial frame update may refer to pixel data associated with the first ROI being transferred to a frame buffer in a DDIC. For example, the aforementioned aspect may correspond to the partial frame update 502.

In one aspect, the first ROI of the frame may be within a threshold distance of the second ROI of the frame. For example, the first ROI 512 may be within a threshold distance of the second ROI 516 in FIG. 5.

In one aspect, obtaining the hardware-based indication may include obtaining the hardware-based indication based on pixel data associated with the first ROI being removed from a buffer. For example, the aforementioned aspect may correspond to PP_DONE_irq 1006. In an example, the buffer may be or include the ping-pong buffers 1714.

In one aspect, obtaining the hardware-based indication may include obtaining the hardware-based indication based on a counter associated with the first ROI reaching a software programmable value. For example, the aforementioned aspect may correspond to WR_PTR_irq 1004. The counter may be based on pixel data being transferred.

In one aspect, the apparatus (e.g., a display processor) may configure, prior to the execution of the first set of command packets, the first set of command packets and a first set of command descriptors for the first set of command packets. For example, FIG. 18 at 1805 shows that the first display processor component 1802 may configure, prior to the execution of the first set of command packets, the first set of command packets and a first set of command descriptors for the first set of command packets. In an example, the first set of command descriptors may be or include the first CD 906. In an example, the first set of command descriptors may be or include the command descriptors 812. In an example, the first set of command descriptors may be or include the command descriptor 1502. A command descriptor may include information regarding DDR memory locations and sizes of command packets.

In one aspect, the apparatus (e.g., a display processor) may configure, prior to the execution of the second set of command packets, the second set of command packets and a second set of command descriptors for the second set of command packets. For example, FIG. 18 at 1806 shows that the first display processor component 1802 may configure, prior to the execution of the second set of command packets, the second set of command packets and a second set of command descriptors for the second set of command packets. In an example, the second set of command descriptors may be or include the second CD 908. In an example, the second set of command descriptors may be or include the command descriptors 812. In an example, the second set of command descriptors may be or include the command descriptor 1502.

In one aspect, the apparatus (e.g., a display processor) may store, in a queue, the first set of command descriptors and the second set of command descriptors, where executing the first set of command packets may include executing the first set of command packets based on the first set of command descriptors, and where executing the second set of command packets may include executing the second set of command packets based on the second set of command descriptors. For example, FIG. 18 at 1808 shows that the first display processor component 1802 may store, in a queue, the first set of command descriptors and the second set of command descriptors, where executing the first set of command packets at 1816 may include executing the first set of command packets based on the first set of command descriptors, and where executing the second set of command packets at 1824 may include executing the second set of command packets based on the second set of command descriptors. In an example, the queue may be or include the command queue 806 or the command queue 902.

In one aspect, the apparatus (e.g., a display processor) may retrieve, from memory, the first set of command packets based on the stored first set of command descriptors. For example, FIG. 18 at 1812 shows that the first display processor component 1802 may retrieve, from memory, the first set of command packets based on the stored first set of command descriptors. In an example, the memory may be or include the DDR memory 816.

In one aspect, the apparatus (e.g., a display processor) may retrieve, from the memory, the second set of command packets based on the stored second set of command descriptors. For example, FIG. 18 at 1818 shows that the first display processor component 1802 may retrieve, from memory, the second set of command packets based on the stored second set of command descriptors. In an example, the memory may be or include the DDR memory 816.

In one aspect, retrieving the first set of command packets from the memory may include retrieving the first set of command packets from the memory via an advanced extensible interface (AXI), and where retrieving the second set of command packets from the memory may include retrieving the second set of command packets from the memory via the AXI. For example, retrieving the first set of command packets from the memory at 1812 may include retrieving the first set of command packets from the memory via an advanced eXtensible interface (AXI), and where retrieving the second set of command packets from the memory at 1818 may include retrieving the second set of command packets from the memory via the AXI. In an example, the AXI may be or include the AXI 804.

In one aspect, the stored first set of command descriptors may include a first set of memory addresses and sizes of the first set of command packets and the stored second set of command descriptors may include a second set of memory addresses and sizes of the second set of command packets, where retrieving the first set of command packets based on the stored first set of command descriptors may include retrieving the first set of command packets based on the first set of memory addresses and sizes, and where retrieving the second set of command packets based on the stored second set of command descriptors may include retrieving the second set of command packets based on the second set of memory addresses and sizes. For example, the first set of memory addresses and sizes and the second set of memory addresses and sizes may be associated with the MEM_ADDR 1508 and the MEM_SIZE 1510. In an example, retrieving the first set of command packets based on the stored first set of command descriptors at 1812 may include retrieving the first set of command packets based on the first set of memory addresses and sizes, and where retrieving the second set of command packets based on the stored second set of command descriptors at 1818 may include retrieving the second set of command packets based on the second set of memory addresses and sizes.

In one aspect, a command packet in the second set of command packets may indicate that the second ROI is a last ROI for the frame, and the apparatus (e.g., a display processor) may execute, based on a second obtained software-based indication, a third set of command packets associated with an ROI of a second frame that is to be updated. For example, FIG. 18 at shows that the first display processor component 1802 may execute, based on a second obtained software-based indication, a third set of command packets associated with an ROI of a second frame that is to be updated. In an example, the aforementioned aspect may correspond to 1220 in FIG. 12.

In one aspect, the hardware-based indication may include an interrupt request (irq). For example, the hardware-based indication may be WR_PTR_irq 1004 or PP_DONE_irq 1006.

In one aspect, executing the first set of command packets may include configuring a first set of configuration registers for the first ROI, and where executing the second set of command packets may include configuring a second set of configuration registers for the second ROI. For example, executing the first set of command packets at 1816 may include configuring a first set of configuration registers for the first ROI, and executing the second set of command packets at 1824 may include configuring a second set of configuration registers for the second ROI.

In one aspect, the first set of command packets may include a first operation code (OPCODE) and the second set of command packets may include a second OPCODE, and the apparatus (e.g., a display processor) may decode the first OPCODE, where configuring the first set of configuration registers may include configuring the first set of configuration registers based on the decoded first OPCODE. For example, FIG. 18 at 1814 shows that the first display processor component 1802 may decode the first OPCODE, where configuring the first set of configuration registers may include configuring the first set of configuration registers based on the decoded first OPCODE. In an example, the aforementioned aspect may correspond to the OP code packet 1504 and the OPCODE 1524 in FIG. 15.

In one aspect, the first set of command packets may include a first operation code (OPCODE) and the second set of command packets may include a second OPCODE, and the apparatus (e.g., a display processor) may decode the second OPCODE, where configuring the second set of configuration registers may include configuring the second set of configuration registers based on the decoded second OPCODE. For example, FIG. 18 at 1820 shows that the first display processor component 1802 may decode the second OPCODE, where configuring the second set of configuration registers may include configuring the second set of configuration registers based on the decoded second OPCODE. In an example, the aforementioned aspect may correspond to the OP code packet 1504 and the OPCODE 1524 in FIG. 15.

In one aspect, the first OPCODE may include a first non-operation, a first register write operation, a first register modify operation, a first single block write operation, a first incremented block write operation, a first multiple block write operation, a first look-up table (LUT) operation, or a first reserved operation, and the second OPCODE may include a second non-operation, a second register write operation, a second register modify operation, a second single block write operation, a second incremented block write operation, a second multiple block write operation, a second look-up table (LUT) operation, or a second reserved operation. For example, the aforementioned aspect may pertain to Table 2 above.

In one aspect, executing the first set of command packets may include executing the first set of command packets via a configuration accelerator, and where executing the second set of command packets may include executing the second set of command packets via the configuration accelerator. For example, executing the first set of command packets at 1186 may include executing the first set of command packets via a look-up table direct memory access (LUTDMA) engine (i.e., a configuration accelerator), and executing the second set of command packets at 1824 may include executing the second set of command packets via the LUTDMA engine (i.e., a configuration accelerator). In an example, the configuration accelerator may be or include the LUTDMA engine 802.

In one aspect, the obtained software-based indication may be associated with a first latency, the obtained hardware-based indication may be associated with a second latency, and the first latency may be greater than the second latency. For example, the first latency may be or include the ISR latency 704 and/or the config execution latency 706. In another example, the aforementioned aspect may correspond to the example 1302 in FIG. 13.

In one aspect, the apparatus (e.g., a display processor) may obtain a second hardware-based indication that indicates that the second set of command packets associated with the second ROI of the frame has been executed. For example, FIG. 18 at 1830 shows that the first display processor component 1802 may obtain a second hardware-based indication that indicates that the second set of command packets associated with the second ROI of the frame has been executed.

In one aspect, the apparatus (e.g., a display processor) may execute, based on the obtained second hardware-based indication, a third set of command packets associated with a third ROI of the frame that is to be updated. For example, FIG. 18 at 1832 shows that the first display processor component 1802 may execute, based on the obtained second hardware-based indication, a third set of command packets associated with a third ROI of the frame that is to be updated.

In one aspect, the apparatus (e.g., a display processor) may output an indication of at least one of the executed first set of command packets or the executed second set of command packets. For example, FIG. 18 at 1826 shows that the first display processor component 1802 may output an indication of at least one of the executed first set of command packets or the executed second set of command packets.

In one aspect, outputting the indication of at least one of the executed first set of command packets or the executed second set of command packets may include: transmitting the indication of at least one of the executed first set of command packets or the executed second set of command packets. For example, FIG. 18 at 1826A shows that the first display processor component 1802 may transmit (e.g., to the second display processor component 1804) the indication of at least one of the executed first set of command packets or the executed second set of command packets.

In one aspect, outputting the indication of at least one of the executed first set of command packets or the executed second set of command packets may include storing the indication of at least one of the executed first set of command packets or the executed second set of command packets. For example, outputting the indication of at least one of the executed first set of command packets or the executed second set of command packets at 1826 may include storing the indication of at least one of the executed first set of command packets or the executed second set of command packets.

In configurations, a method or an apparatus for display processing is provided. The apparatus may be a DPU, a display processor, or some other processor that may perform display processing. In aspects, the apparatus may be the display processor 127 within the device 104, or may be some other hardware within the device 104 or another device. The apparatus may include means for obtaining a software-based indication that indicates to start an execution of command packets. The apparatus may further include means for executing, based on the obtained software-based indication, a first set of command packets associated with a first region of interest (ROI) of a frame that is to be updated. The apparatus may further include means for obtaining a hardware-based indication that indicates that the first set of command packets associated with the first ROI of the frame has been executed. The apparatus may further include means for executing, based on the obtained hardware-based indication, a second set of command packets associated with a second ROI of the frame that is to be updated. The apparatus may further include means for configuring, prior to the execution of the first set of command packets, the first set of command packets and a first set of command descriptors for the first set of command packets. The apparatus may further include means for configuring, prior to the execution of the second set of command packets, the second set of command packets and a second set of command descriptors for the second set of command packets. The apparatus may further include means for storing, in a queue, the first set of command descriptors and the second set of command descriptors, where executing the first set of command packets includes executing the first set of command packets based on the first set of command descriptors, and where executing the second set of command packets includes executing the second set of command packets based on the second set of command descriptors. The apparatus may further include means for retrieving, from memory, the first set of command packets based on the stored first set of command descriptors. The apparatus may further include means for retrieving, from the memory, the second set of command packets based on the stored second set of command descriptors. The apparatus may further include means for executing, based on a second obtained software-based indication, a third set of command packets associated with an ROI of a second frame that is to be updated. The apparatus may further include means for decoding the first OPCODE, where configuring the first set of configuration registers includes configuring the first set of configuration registers based on the decoded first OPCODE. The apparatus may further include means for decoding the second OPCODE, where configuring the second set of configuration registers includes configuring the second set of configuration registers based on the decoded second OPCODE. The apparatus may further include means for obtaining a second hardware-based indication that indicates that the second set of command packets associated with the second ROI of the frame has been executed. The apparatus may further include means for executing, based on the obtained second hardware-based indication, a third set of command packets associated with a third ROI of the frame that is to be updated. The apparatus may further include means for outputting an indication of at least one of the executed first set of command packets or the executed second set of command packets.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of display processing, including: obtaining a software-based indication that indicates to start an execution of command packets; executing, based on the obtained software-based indication, a first set of command packets associated with a first region of interest (ROI) of a frame that is to be updated; obtaining a hardware-based indication that indicates that the first set of command packets associated with the first ROI of the frame has been executed; and executing, based on the obtained hardware-based indication, a second set of command packets associated with a second ROI of the frame that is to be updated.

Aspect 2 may be combined with aspect 1, wherein the first ROI of the frame and the second ROI of the frame are associated with a partial frame update of the frame.

Aspect 3 may be combined with any of aspects 1-2, wherein the first ROI of the frame is within a threshold distance of the second ROI of the frame.

Aspect 4 may be combined with any of aspects 1-3, wherein obtaining the hardware-based indication includes obtaining the hardware-based indication based on pixel data associated with the first ROI being removed from a buffer.

Aspect 5 may be combined with any of aspects 1-3, wherein obtaining the hardware-based indication includes obtaining the hardware-based indication based on a counter associated with the first ROI reaching a software programmable value.

Aspect 6 may be combined with any of aspects 1-5, further including: configuring, prior to the execution of the first set of command packets, the first set of command packets and a first set of command descriptors for the first set of command packets; configuring, prior to the execution of the second set of command packets, the second set of command packets and a second set of command descriptors for the second set of command packets; and storing, in a queue, the first set of command descriptors and the second set of command descriptors, wherein executing the first set of command packets includes executing the first set of command packets based on the first set of command descriptors, and wherein executing the second set of command packets includes executing the second set of command packets based on the second set of command descriptors.

Aspect 7 may be combined with aspect 6, further including: retrieving, from memory, the first set of command packets based on the stored first set of command descriptors; and retrieving, from the memory, the second set of command packets based on the stored second set of command descriptors.

Aspect 8 may be combined with aspect 7, wherein retrieving the first set of command packets from the memory includes retrieving the first set of command packets from the memory via an advanced extensible interface (AXI), and wherein retrieving the second set of command packets from the memory includes retrieving the second set of command packets from the memory via the AXI.

Aspect 9 may be combined with any of aspects 7-8, wherein the stored first set of command descriptors includes a first set of memory addresses and sizes of the first set of command packets and the stored second set of command descriptors includes a second set of memory addresses and sizes of the second set of command packets, wherein retrieving the first set of command packets based on the stored first set of command descriptors includes retrieving the first set of command packets based on the first set of memory addresses and sizes, and wherein retrieving the second set of command packets based on the stored second set of command descriptors includes retrieving the second set of command packets based on the second set of memory addresses and sizes.

Aspect 10 may be combined with any of aspects 1-9, wherein a command packet in the second set of command packets indicates that the second ROI is a last ROI for the frame, the method further including: executing, based on a second obtained software-based indication, a third set of command packets associated with an ROI of a second frame that is to be updated.

Aspect 11 may be combined with any of aspects 1-10, wherein the hardware-based indication includes an interrupt request (irq).

Aspect 12 may be combined with any of aspects 1-11, wherein executing the first set of command packets includes configuring a first set of configuration registers for the first ROI, and wherein executing the second set of command packets includes configuring a second set of configuration registers for the second ROI.

Aspect 13 may be combined with aspect 12, wherein the first set of command packets includes a first operation code (OPCODE) and the second set of command packets includes a second OPCODE, the method further including: decoding the first OPCODE, wherein configuring the first set of configuration registers includes configuring the first set of configuration registers based on the decoded first OPCODE; and decoding the second OPCODE, wherein configuring the second set of configuration registers includes configuring the second set of configuration registers based on the decoded second OPCODE.

Aspect 14 may be combined with aspect 13, wherein the first OPCODE includes a first non-operation, a first register write operation, a first register modify operation, a first single block write operation, a first incremented block write operation, a first multiple block write operation, a first look-up table (LUT) operation, or a first reserved operation, and wherein the second OPCODE includes a second non-operation, a second register write operation, a second register modify operation, a second single block write operation, a second incremented block write operation, a second multiple block write operation, a second look-up table (LUT) operation, or a second reserved operation.

Aspect 15 may be combined with any of aspects 1-14, wherein executing the first set of command packets includes executing the first set of command packets via a configuration accelerator, and wherein executing the second set of command packets includes executing the second set of command packets via the configuration accelerator.

Aspect 16 may be combined with any of aspects 1-15, wherein the obtained software-based indication is associated with a first latency, wherein the obtained hardware-based indication is associated with a second latency, and wherein the first latency is greater than the second latency.

Aspect 17 may be combined with any of aspects 1-16, further including: obtaining a second hardware-based indication that indicates that the second set of command packets associated with the second ROI of the frame has been executed; and executing, based on the obtained second hardware-based indication, a third set of command packets associated with a third ROI of the frame that is to be updated.

Aspect 18 may be combined with any of aspects 1-17, further including: outputting an indication of at least one of the executed first set of command packets or the executed second set of command packets.

Aspect 19 may be combined with aspect 18, wherein outputting the indication of at least one of the executed first set of command packets or the executed second set of command packets includes: transmitting the indication of at least one of the executed first set of command packets or the executed second set of command packets; or storing the indication of at least one of the executed first set of command packets or the executed second set of command packets.

Aspect 20 is an apparatus for display processing comprising a processor coupled to a memory and, based on information stored in the memory, the processor is configured to implement a method as in any of aspects 1-19.

Aspect 21 may be combined with aspect 20 and comprises that the apparatus is a wireless communication device comprising at least one of a transceiver or an antenna coupled to the processor.

Aspect 22 is an apparatus for display processing comprising means for implementing a method as in any of aspects 1-19.

Aspect 23 is a computer-readable medium (e.g., a non-transitory computer readable-medium) storing computer executable code, the computer executable code, when executed by a processor, causes the processor to implement a method as in any of aspects 1-19.

Various aspects have been described herein. These and other aspects are within the scope of the following claims.

What is claimed is:

1. An apparatus for display processing, comprising:

a memory; and a processor coupled to the memory and, based on information stored in the memory, the processor is configured to:

obtain a software-based indication that indicates to start an execution of command packets;

execute, based on the obtained software-based indication, a first set of command packets associated with a first region of interest (ROI) of a frame that is to be updated;

obtain, based on a transfer of pixel data associated with the first ROI from a buffer and before the pixel data has been fully transferred, a hardware-based indication that indicates that a second set of command packets associated with a second ROI of the frame is capable of execution, wherein the hardware-based indication is based on a counter associated with the transfer of the pixel data that has reached a software programmable value; and execute, based on the obtained hardware-based indication, the second set of command packets associated with the second ROI of the frame that is to be updated.

2. The apparatus of claim 1, wherein the first ROI of the frame and the second ROI of the frame are associated with a partial frame update of the frame.

3. The apparatus of claim 1, wherein the first ROI of the frame is within a threshold distance of the second ROI of the frame.

4. The apparatus of claim 1, wherein the processor is further configured to:

configure, prior to the execution of the first set of command packets, the first set of command packets and a first set of command descriptors for the first set of command packets;

configure, prior to the execution of the second set of command packets, the second set of command packets and a second set of command descriptors for the second set of command packets; and store, in a queue, the first set of command descriptors and the second set of command descriptors, wherein to execute the first set of command packets, the processor is configured to execute the first set of command packets based on the first set of command descriptors, and wherein to execute the second set of command packets, the processor is configured to execute the second set of command packets based on the second set of command descriptors.

5. The apparatus of claim 4, wherein the processor is further configured to:

retrieve, from the memory, the first set of command packets based on the stored first set of command descriptors; and retrieve, from the memory, the second set of command packets based on the stored second set of command descriptors.

6. The apparatus of claim 5, wherein to retrieve the first set of command packets from the memory, the processor is configured to retrieve the first set of command packets from the memory via an advanced extensible interface (AXI), and wherein to retrieve the second set of command packets from the memory, the processor is configured to retrieve the second set of command packets from the memory via the AXI.

7. The apparatus of claim 5, wherein the stored first set of command descriptors comprises a first set of memory addresses and sizes of the first set of command packets and the stored second set of command descriptors comprises a second set of memory addresses and sizes of the second set of command packets, wherein to retrieve the first set of command packets based on the stored first set of command descriptors, the processor is configured to retrieve the first set of command packets based on the first set of memory addresses and sizes, and wherein to retrieve the second set of command packets based on the stored second set of command descriptors, the processor is configured to retrieve the second set of command packets based on the second set of memory addresses and sizes.

8. The apparatus of claim 1, wherein a command packet in the second set of command packets indicates that the second ROI is a last ROI for the frame, wherein the processor is further configured to:

execute, based on a second obtained software-based indication, a third set of command packets associated with an ROI of a second frame that is to be updated.

9. The apparatus of claim 1, wherein the hardware-based indication comprises an interrupt request (irq).

10. The apparatus of claim 1, wherein to execute the first set of command packets, the processor is configured to configure a first set of configuration registers for the first ROI, and wherein to execute the second set of command packets, the processor is configured to configure a second set of configuration registers for the second ROI.

11. The apparatus of claim 10, wherein the first set of command packets comprises a first operation code (OPCODE) and the second set of command packets comprises a second OPCODE, wherein the processor is further configured to:

decode the first OPCODE, wherein to configure the first set of configuration registers, the processor is configured to configure the first set of configuration registers based on the decoded first OPCODE; and decode the second OPCODE, wherein to configure the second set of configuration registers, the processor is configured to configure the second set of configuration registers based on the decoded second OPCODE.

12. The apparatus of claim 11, wherein the first OPCODE comprises a first non-operation, a first register write operation, a first register modify operation, a first single block write operation, a first incremented block write operation, a first multiple block write operation, a first look-up table (LUT) operation, or a first reserved operation, and wherein the second OPCODE comprises a second non-operation, a second register write operation, a second register modify operation, a second single block write operation, a second incremented block write operation, a second multiple block write operation, a second look-up table (LUT) operation, or a second reserved operation.

13. The apparatus of claim 1, wherein to execute the first set of command packets, the processor is configured to execute the first set of command packets via a configuration accelerator, and wherein to execute the second set of command packets, the processor is configured to execute the second set of command packets via the configuration accelerator.

14. The apparatus of claim 1, wherein the obtained software-based indication is associated with a first latency, wherein the obtained hardware-based indication is associated with a second latency, and wherein the first latency is greater than the second latency.

15. The apparatus of claim 1, wherein the pixel data is first pixel data, and wherein the processor is further configured to:

obtain, based on an additional transfer of second pixel data from the buffer, a second hardware-based indication that indicates that a third set of command packets associated with a third ROI of the frame is capable of execution; and execute, based on the obtained second hardware-based indication, the third set of command packets associated with the third ROI of the frame that is to be updated.

16. The apparatus of claim 1, wherein the processor is further configured to:

output an indication of at least one of the executed first set of command packets or the executed second set of command packets.

17. The apparatus of claim 16, wherein to output the indication of at least one of the executed first set of command packets or the executed second set of command packets, the processor is configured to:

transmit the indication of at least one of the executed first set of command packets or the executed second set of command packets; or store the indication of at least one of the executed first set of command packets or the executed second set of command packets.

18. The apparatus of claim 16, wherein the apparatus is a wireless communication device comprising at least one of a transceiver or an antenna coupled to the processor.

19. A method of display processing, comprising:

obtaining a software-based indication that indicates to start an execution of command packets;

executing, based on the obtained software-based indication, a first set of command packets associated with a first region of interest (ROI) of a frame that is to be updated;

obtaining, based on a transfer of pixel data associated with the first ROI from a buffer and before the pixel data has been fully transferred, a hardware-based indication that indicates that a second set of command packets associated with a second ROI of the frame is capable of execution, wherein the hardware-based indication is based on a counter associated with the transfer of the pixel data that has reached a software programmable value; and executing, based on the obtained hardware-based indication, the second set of command packets associated with the second ROI of the frame that is to be updated.

20. The method of claim 19, wherein the first ROI of the frame and the second ROI of the frame are associated with a partial frame update of the frame.

21. The method of claim 19, wherein the first ROI of the frame is within a threshold distance of the second ROI of the frame.

22. The method of claim 19, further comprising:

configuring, prior to the execution of the first set of command packets, the first set of command packets and a first set of command descriptors for the first set of command packets;

configuring, prior to the execution of the second set of command packets, the second set of command packets and a second set of command descriptors for the second set of command packets; and storing, in a queue, the first set of command descriptors and the second set of command descriptors, wherein executing the first set of command packets comprises executing the first set of command packets based on the first set of command descriptors, and wherein executing the second set of command packets comprises executing the second set of command packets based on the second set of command descriptors.

23. The method of claim 22, further comprising:

retrieving, from memory, the first set of command packets based on the stored first set of command descriptors; and retrieving, from the memory, the second set of command packets based on the stored second set of command descriptors.

24. The method of claim 23, wherein retrieving the first set of command packets from the memory comprises retrieving the first set of command packets from the memory via an advanced extensible interface (AXI), and wherein retrieving the second set of command packets from the memory comprises retrieving the second set of command packets from the memory via the AXI.

25. The method of claim 23, wherein the stored first set of command descriptors comprises a first set of memory addresses and sizes of the first set of command packets and the stored second set of command descriptors comprises a second set of memory addresses and sizes of the second set of command packets, wherein retrieving the first set of command packets based on the stored first set of command descriptors comprises retrieving the first set of command packets based on the first set of memory addresses and sizes, and wherein retrieving the second set of command packets based on the stored second set of command descriptors comprises retrieving the second set of command packets based on the second set of memory addresses and sizes.

26. A non-transitory computer-readable medium storing computer executable code, the computer executable code, when executed by a processor, causes the processor to:

obtain a software-based indication that indicates to start an execution of command packets;

execute, based on the obtained software-based indication, a first set of command packets associated with a first region of interest (ROI) of a frame that is to be updated;

obtain, based on a transfer of pixel data associated with the first ROI from a buffer and before the pixel data has been fully transferred, a hardware-based indication that indicates that a second set of command packets associated with a second ROI of the frame is capable of execution, wherein the hardware-based indication is based on a counter associated with the transfer of the pixel data that has reached a software programmable value; and execute, based on the obtained hardware-based indication, the second set of command packets associated with the second ROI of the frame that is to be updated.

27. The non-transitory computer-readable medium of claim 26, wherein the first ROI of the frame and the second ROI of the frame are associated with a partial frame update of the frame.

28. The non-transitory computer-readable medium of claim 26, wherein the first ROI of the frame is within a threshold distance of the second ROI of the frame.

29. The non-transitory computer-readable medium of claim 26, wherein the computer executable code, when executed by the processor, further causes the processor to execute the first set of command packets via a configuration accelerator, and execute the second set of command packets via the configuration accelerator.

30. The non-transitory computer-readable medium of claim 26, wherein the hardware-based indication comprises an interrupt request (irq).

* * * * *